US010560764B2

(12) United States Patent
Solomon et al.

(10) Patent No.: US 10,560,764 B2
(45) Date of Patent: Feb. 11, 2020

(54) SYSTEM, METHOD, AND APPARATUS FOR SYNCHRONIZING SENSORS FOR SIGNAL DETECTION

(71) Applicant: Aquarius Spectrum Ltd., Netanya (IL)

(72) Inventors: David Solomon, Netanya (IL); Zeev Efrat, Netanya (IL); Baruch Solomon, Netanya (IL)

(73) Assignee: AQUARIUS SPECTRUM LTD., Netanya (IL)

( * ) Notice: Subject to any disclaimer, the term of this patent is extended or adjusted under 35 U.S.C. 154(b) by 441 days.

(21) Appl. No.: 14/722,912

(22) Filed: May 27, 2015

(65) Prior Publication Data
US 2015/0350752 A1    Dec. 3, 2015

Related U.S. Application Data

(60) Provisional application No. 62/005,617, filed on May 30, 2014.

(51) Int. Cl.
*H04Q 9/04* (2006.01)
*G01M 3/04* (2006.01)
*G01M 3/24* (2006.01)

(52) U.S. Cl.
CPC ............... *H04Q 9/04* (2013.01); *G01M 3/04* (2013.01); *G01M 3/24* (2013.01); *H04Q 2209/40* (2013.01); *H04Q 2209/845* (2013.01)

(58) Field of Classification Search
CPC ............... H04Q 9/04; H04Q 2209/40; H04Q 2209/845; G01M 3/243; G01M 3/04; G01M 3/24
See application file for complete search history.

(56) References Cited

U.S. PATENT DOCUMENTS

| 2008/0008044 | A1 | 1/2008 | Patterson et al. |
| 2010/0008515 | A1 | 1/2010 | Fulton et al. |
| 2011/0196651 | A1 | 8/2011 | Delin et al. |
| 2013/0238829 | A1* | 9/2013 | Laycock ............. H04R 1/1033 710/303 |

FOREIGN PATENT DOCUMENTS

| EP | 0 831 316 A2 | 3/1998 | |
| EP | 0831316 A2 * | 3/1998 | ............ G01M 3/243 |
| JP | 2000-266626 A | 9/2000 | |
| JP | 2000266626 * | 9/2000 | ............ G01B 17/00 |
| KR | 20110032272 * | 3/2011 | ............ G01M 3/04 |

(Continued)

OTHER PUBLICATIONS

Translation of JP 2000-2666626.*

(Continued)

*Primary Examiner* — Patrick N Edouard
*Assistant Examiner* — Eboni N Giles
(74) *Attorney, Agent, or Firm* — Foley & Lardner LLP

(57) ABSTRACT

Systems and methods for taking sensor measurements is provided. The system includes a sensor configured to detect sensor inputs from a signal source and generate a sensor output signal. The system further includes a synchronization adaptor configured to receive the sensor output signal, to transmit a timing synchronization signal on a communication channel, and to transmit the sensor output signal on the communication channel.

20 Claims, 30 Drawing Sheets

(56) References Cited

FOREIGN PATENT DOCUMENTS

| KR | 20110032272 A | 3/2011 | |
|---|---|---|---|
| WO | WO 2012/101646 A1 | 8/2012 | |
| WO | WO 2014/046122 A1 | 3/2014 | |
| WO | WO-2014046122 A1 * | 3/2014 | .............. G01M 3/24 |

OTHER PUBLICATIONS

Translation of KR 10-2011-0032272.*
English Translation of KR 20110032272.*
Hunaidi et al. "Acoustic methods for locating leaks in municipal water pipe networks". Institute for Research in Construction, International Conference on Water Demand Management, NRCC-47062, May 30-Jun. 3, 2004, pp. 1-14.
Extended European Search Report dated Oct. 30, 2015 in related European Appl. No. 15169773.7 (10 pgs.).

* cited by examiner

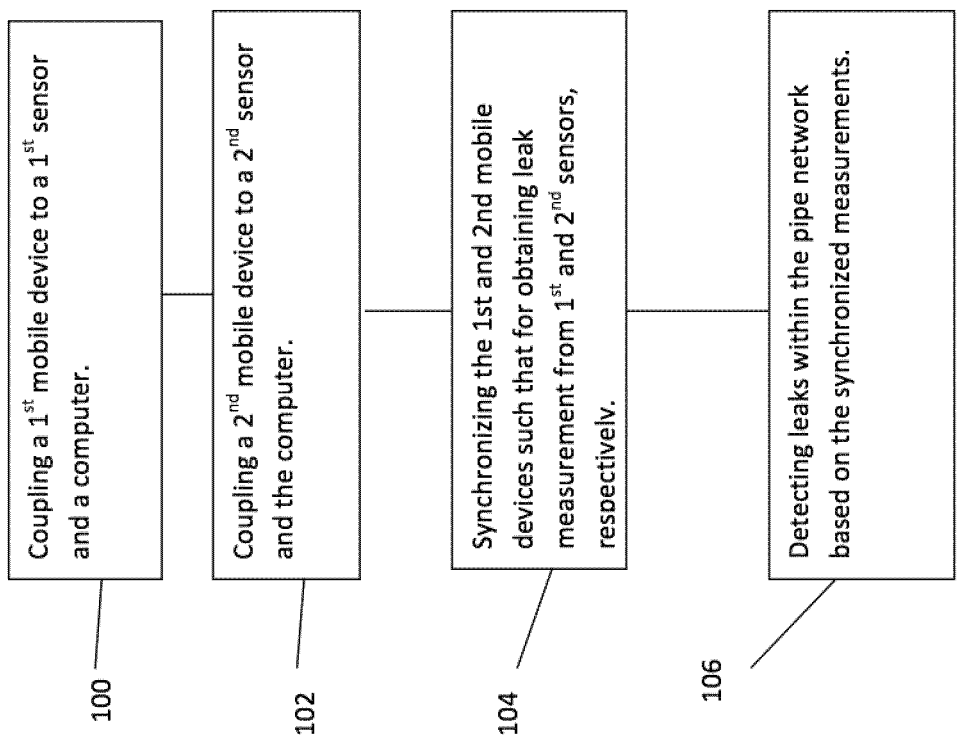

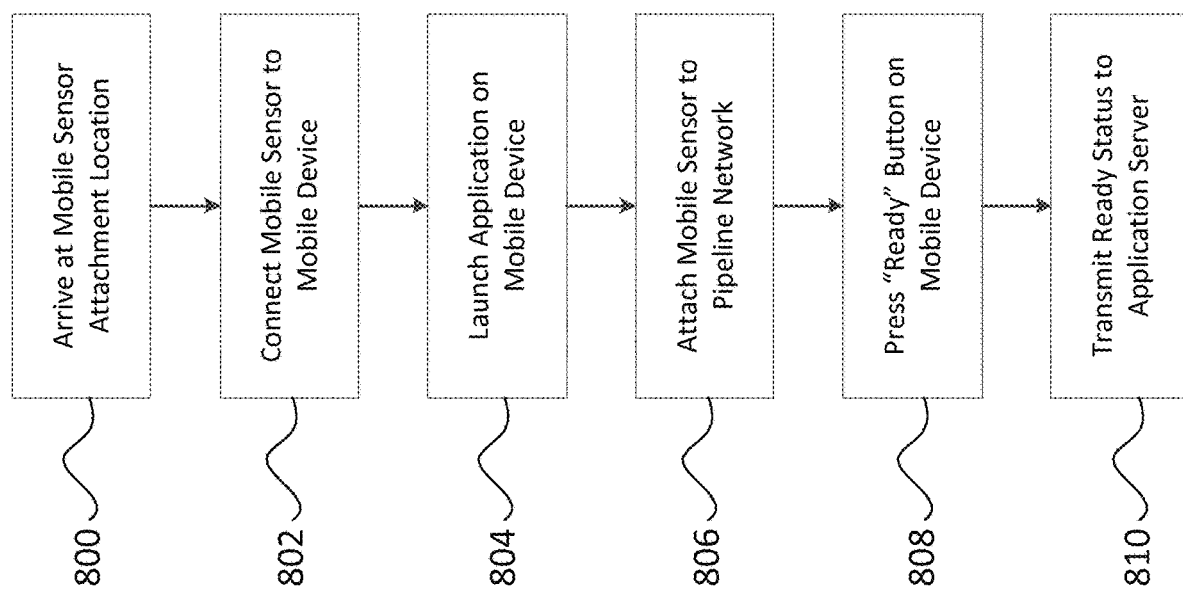

SYSTEM, METHOD, AND APPARATUS FOR SYNCHRONIZING SENSORS FOR SIGNAL DETECTION

CROSS REFERENCE TO RELATED APPLICATIONS

This application claims the benefit and priority from U.S. Provisional Patent Application Ser. No. 62/005,617, filed on May 30, 2014, the disclosure of which is hereby incorporated by reference in its entirety.

BACKGROUND

Field of the Disclosure

The present disclosure relates generally to synchronizing sensors for use during signal detection. More particularly, embodiments of the present disclosure may be used to synchronize sensors used to detect leaks in a pipeline network.

Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Town, cities, and other municipal areas all generally may include some form of one or more pipelined underground networks, such as a water network, and/or a sewer network and the like. Underground modern pipe networks are generally adapted to carry large amounts of fluids, i.e., water, to and from various pools, reservoirs residential and/or commercial facilities, to the extent such societies have become completely dependent on the proper operation of such pipeline networks. Indeed the proper operation of such systems cannot be overly underestimated, as it is not uncommon for such networks to suffer from occasional failures, such as leaks, which can cause major disruptions in the delivery, for example, of water to and/or from desired locations. Moreover, the inability to quickly locate and fix such failures may exacerbate the loss of water, which could further lead to unnecessary logistical and financial burdens.

U.S. Publication 2008/0008044 describes a system for detecting acoustic events comprising having wearable sensor having a microprocessor and a microphone for communicating with the microprocessor. The system further includes a GPS module, a wireless network system, and a display screen. The microphone being in communication with the microprocessor, thereby allowing the microprocessor to detect the acoustic event and the GPS functions to determine the location of the wearable sensor. In addition, the wireless network system allows for the interfacing and sharing of data between the sensor and other components of the system for detecting acoustic events.

U.S. Publication 2010/0008515 discloses a system for locating and identifying an acoustic event. The system includes an acoustic sensor which has a pair of concentric opposing microphones at a fixed distance on a microphone axis is used for measuring an acoustic intensity. A second acoustic sensor or movement of the first acoustic sensor is used to provide a second vector incorporating the acoustic event.

U.S. Publication 2011/0196651 discloses a sensor web formed of a number of different sensor pods. Each of the sensor pods include a clock which is synchronized with a master clock so that all of the sensor pods in the web have a synchronized clock. The synchronization is carried out by first using a coarse synchronization which takes less power, and subsequently carrying out a fine synchronization to make a fine sync of all the pods on the web. After the synchronization, the pods ping their neighbors to determine which pods are listening and responded, and then only listen during time slots corresponding to those pods which respond.

WO 12/101646, assigned to the assignee of the present application describes a method and system for leak detection in a pipe network. Accordingly, there is disclosed a device for leak detection and localization in at least a portion of a fluid distribution system. At each of two or more locations, a position locator determines the location of the device and a vibration sensor generates a signal indicative of vibrations detected by the vibration sensor at the location. A processor calculates a parameter of the signal indicative of an average power of the signal at the location over a predetermined time period. For each location, the processor stores in a memory the location of the device and the value of calculated parameter, and then determines a location in the fluid distribution system where the calculated parameter has a maximum value satisfying a predetermined criterion.

A document by the National Research council Canada, entitled "Acoustic methods for locating leaks in municipal water pipe," discloses obtaining correlation functions of leak noise signals measured at two points for providing information about the time delay between the two signals from two opposing endpoints of the leak. The time delay between the two leak signals is the result of one measurement point being closer to the leak location than the other. The time shift between the arriving signals will be equal to the distance between the measurement points divided by the propagation speed of leak noise in the pipe. Thus, the correlation magnitude of two leak noise signals is the summation of their product as a function of time shift, or stated otherwise, the correlation value at time shift T is computed by first shifting one of the signals by T relative to the other signal. Then the two signals are multiplied at each point to form a summation. A peak in the correlation function corresponds to measured delay between the two leak noise signals.

SUMMARY

Certain aspects of embodiments disclosed herein by way of example are summarized below. It should be understood that these aspects are presented merely to provide the reader with a brief summary of certain forms of a disclosure described and/or claimed herein might take and that these aspects are not intended to limit the scope of any disclosure described and/or claimed herein. Indeed, any disclosure described and/or claimed herein may encompass a variety of aspects that may not be set forth below.

The present disclosure relates to methods and systems adapted to detect leaks in underground networks utilizing mobile devices. More particularly, the present technique may utilize mobile devices, such as smartphones, tablets and other personal digital assistants PDAs to locate the present of a leak in an underground pipeline network. Accordingly, it should be understood that the mobile devices as described herein include wireless communication capabilities, including but not limited to Global Position Systems (GPS), cellular communications, wide-area communications (e.g., WiMax), local-area communications (e.g., WiFi), Bluetooth communications, and other short or long range radio frequency (RF) communications enabling the aforementioned mobile devices to communicate in various manners and be part of public and/or private networks, such as Internet, Ethernet or other communications networks. More particularly, the present technique may utilize mobile devices (e.g., smartphones, tablets, PDAs) to locate the presence of a leak in an underground pipeline network. As will be described in further detail below, in an exemplary embodiment of the present technique, two or more mobile devices, such as smartphone devices, may be used to locate a presence of a leak in the underground pipeline network. In such a configuration, each of the smartphone devices may be coupled to a sensor that is further coupled to the network. Such sensors are adapted to detect the presence of signals indicative of leak within the network and to provide an indication of a possible leak within the pipeline network. Advantageously, each of the smartphones can employ its GPS module for obtaining repeated time stamps from a GPS signal. In so doing, each of the smartphones can further employ various algorithms to process the sampled time stamps to obtain a very high degree of accuracy (less than 5 ms) in time between the two or more smartphones. Once this degree of accuracy is achieved the use of two or more smartphones are said to be synchronized in obtaining sensor measurements from the sensors to which the smartphones are coupled.

Hence, by synchronously obtaining measurements from each of the sensors, the presence of the leak can be pinpointed with great accuracy within the network. The synchronization of the measurements can be accomplished by a server device coupled to the smartphones over a network, such as Internet, Ethernet, or other network. In other exemplary embodiments, three or more mobile devices (e.g., smartphones, tablets, PDAs) utilizing the above mentioned synchronization scheme, can be coupled to a respective sensor for determining the location of a leak within the network with even greater accuracy. Thus, in accordance with exemplary embodiments of the present technique, there is disclosed a method for detecting leaks in a pipe network, the method comprises coupling a first mobile device (e.g., smartphone, tablet, PDA) to a computer, wherein the first mobile device is further coupled to a first sensor of the pipe network. The method further includes coupling a second mobile device (e.g., smartphone, tablet, PDA) to the computer, wherein the second mobile device is further coupled to a second sensor of the pipeline network. In addition, the method includes synchronizing the first and second mobile devices such that measurements obtained from the first and second sensors, are respectively, are correlated for detecting a location of leak within the pipeline network.

In another exemplary embodiment of the present technique, the above mobile detection methods and systems may be used to augment an already detection stationary system installed or otherwise present in an underground network. As such, the stationary system may include sensors adapted to relay information about possible leaks within the network with a certain degree of accuracy. Accordingly, the mobile detection system described herein is adapted to provide an extra layer of detection so that the level of accuracy provided by the stationary network can be increased. Hence, increase in detection accuracy can be achieved by utilizing the mobile devices' (e.g., Smartphone, tablet, PDA) ability to tap into the sensors at locations which may vary or at points located in between the stationary sensors. In so doing, the mobile device can obtain a refined measurement of the pipeline network should a leak be present. Hence, in accordance with the present technique there is disclosed a system for detecting leaks within a network pipe, comprising a first plurality of sensors disposed along the pipe network, wherein the first plurality of sensors are adapted to provide first information on a location of a leak within the network. The system further includes a second plurality of mobile sensors adapted to be coupled to a plurality of mobile devices (e.g., smartphones, tablets, PDA) wherein the second plurality of sensors are adapted to provide second information on the location of the leak within the pipeline network such that the second information is adapted to improve accuracy of the location of the leak provided by the first information.

A system is provided. In some embodiments, the system includes a sensor configured to detect sensor inputs from a signal source and generate a sensor output signal. The system further includes a synchronization adaptor configured to receive the sensor output signal, to transmit a timing synchronization signal on a communication channel, and to transmit the sensor output signal on the communication channel.

In some embodiments, the synchronization adaptor includes a Global Positioning System module configured to generate a GPS timing signal, wherein the timing synchronization signal is based at least in part on the GPS timing signal. In some embodiments, the system further includes a computing device configured to receive the sensor output signal over the communication channel. In some embodiments, the synchronization adaptor further includes a control signal input port configured to receive a synchronization control signal from the computing device; and a switch configured to control transmission of the timing synchronization signal and the sensor output signal on the communication channel based on the synchronization control signal.

In some embodiments, the system is provided so that the computing device is configured to receive the sensor output signal and the timing synchronization signal over the communication channel using an audio jack of the computing device, and the sensor output signal and the timing synchronization signal are received over a microphone channel of the audio jack.

In some embodiments, the system is provided so that the computing device is configured to transmit the synchronization control signal using the audio jack of the computing device, and the synchronization control signal is transmitted over a right audio channel or a left audio channel of the audio jack.

In some embodiments, the system is provided so that the computing device is a mobile computing device and the sensor is a mobile sensor.

In some embodiments, the system is provided so that the computing device is a smartphone and the audio jack is a standard audio jack of the smartphone.

In some embodiments, the system is provided so that the signal source is a pipe of a pipe network, the sensor is a vibration sensor, and the sensor inputs are vibrations emanating from the pipe.

In some embodiments, the system is provided so that the GPS timing signal is a 1 pulse-per-second signal.

A method is provided. In some embodiments, the method includes scheduling, using a server, a scheduled recording time for a plurality of sensors, each sensor of the plurality of sensors coupled to a computing device of a plurality of computing devices, and each computing device of the plurality of computing devices coupled to a synchronization adaptor of a plurality of synchronization adaptors. The method further includes estimating at each computing device a local recording time based at least in part on a local clock for each computing device and the scheduled recording time. The method further includes recording sensor measurements at each sensor beginning at the local recording time for the computing device to which each sensor is coupled. The method further includes receiving at each computing device the sensor measurements and a timing synchronization signal on a communication channel from the synchronization adaptor to which each computing device is coupled.

In some embodiments, the method is provided so that the timing synchronization signal is generated based on a common source of timing information.

In some embodiments, the method is provided so that the common source of timing information is a Global Positioning System.

In some embodiments, the method is provided so that the timing synchronization signal is based on a 1 pulse-per-second signal generated by a Global Positioning System module.

In some embodiments, the method further includes receiving a synchronization control signal at each synchronization adaptor from the computing device to which each synchronization adaptor is coupled, and controlling the transmitting of the timing synchronization signal for a certain period of time on the communication channel from each synchronization adaptor to the computing device to which each synchronization adaptor is coupled based on the received synchronization control signal.

In some embodiments, the method is provided so that each sensor of the plurality of sensors is a mobile sensor and each computing device of the plurality of computing devices is a mobile computing device.

In some embodiments, the method is provided so that each sensor of the plurality of sensors is a vibration sensor coupled to a pipe of a pipe network.

A method is provided. In some embodiments, the method includes receiving a first aggregate sensor reading, wherein the first aggregate sensor reading comprises a first timing synchronization signal portion and a first sensor reading portion. The method further includes receiving a second aggregate sensor reading, wherein the second aggregate sensor reading comprises a second timing synchronization signal portion and a second sensor reading portion. The method further includes synchronizing the first aggregate sensor reading and the second aggregate sensor reading based on a comparison of the first timing synchronization signal portion and the second timing synchronization signal portion. The method further includes determining a signal arrival delay value from the first sensor reading portion and the second sensor reading portion based on a result of the synchronizing the first aggregate sensor reading and the second aggregate sensor reading.

In some embodiments, the method is provided so that the first timing synchronization signal portion and the second timing synchronization signal portion reflect a 1 pulse-per-second signal generated by a Global Positioning System module.

In some embodiments, the method is provided so that the synchronizing the first aggregate sensor reading and the second aggregate sensor reading includes aligning a pulse of the first timing synchronization signal portion with a pulse of the second timing synchronization signal portion.

In some embodiments, the method is provided so that the pulse of the second timing synchronization signal portion is selected as a nearest pulse in time from the second timing synchronization signal portion based on the pulse of the first timing synchronization signal portion.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein:

FIG. 4 is a block diagram of a method in accordance with an embodiment of the present technique.

FIG. 8 shows a flowchart for a method for preparing for measurement at a mobile sensor and mobile device in accordance with some embodiments.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
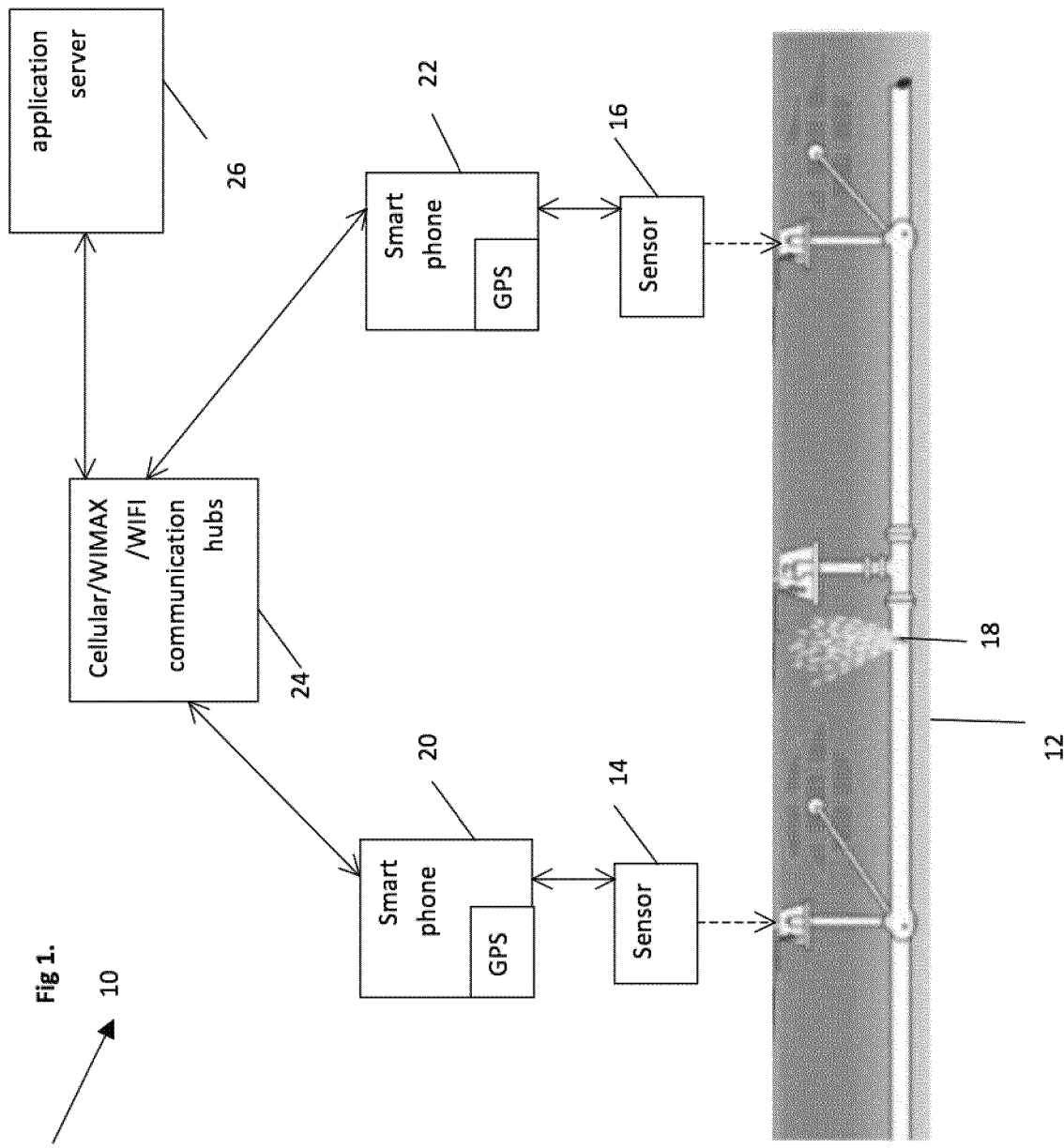
FIG. 1 illustrates a system for detecting locations of leaks in pipeline network, in accordance with an embodiment of the present technique.

Turning now to the figures, FIG. 1 illustrates a system 10 for detecting locations of leaks in pipeline network, in accordance with an embodiment of the present technique. As illustrated pipeline network 12 may form, for example, an underground pipeline extending through one or more regions of a city, town or other municipality. Accordingly, the pipeline may be part of a water system adapted to provide various endpoints with water supply for multiple uses, such as home, office, irrigation, or any other use or service normally existent within an inhabitable area. Alternatively, the pipeline network 12 may be part of a sewer or similar water waste network, while in some embodiments, the pipeline 12 may be part of an industrial complex, whereby pipes within the network are adapted to deliver various fluids, such as chemicals, oils and the like.

As further illustrated, the pipeline network 12 may be couplable to external systems adapted to monitor the ongoing operation of the network, including monitoring fluid flow within pipes of the network for discerning, for example, whether a certain portion of the network may be leaking or is otherwise operating in a non-compliant manner. For example, FIG. 1 illustrates sensors 14 and 16, each coupled to the network 12 at various locations across the network. Hence, the sensors 14 and 16 may be coupled to certain prescribed points along the network where it may convenient or otherwise desirable for attaching such sensors to the network. In one embodiment, the sensors 14 and/or 16 may be mobile and attachable to water hydrants, such as those adapted to provide water supply to fire fighters or other city workers. In other embodiments, the sensors may be coupled to actual pipes within the pipeline networks at various locations.

The sensors 14 and 16 may be adapted to detect mechanical vibrations, so that those could be further converted to electrical signals, form which pertinent parameters, such as average power of the vibration signal can be in an appropriate frequency range. For example, underground pipes buried at a certain depth, frequency ranges may extend between 50-500 Hz, while pipes embedded within concrete floors the ranges of frequencies extend between 500-2 kHz. Hence, the sensors 14 and 16 may each further includes processing devices for performing the aforementioned operations, as well as memory systems for storing the calculated average power, as well as location data at points the data is acquired. The above sensors are described in the above-indicated PCT application WO12101646A, entitled "METHOD AND SYSTEM FOR LEAK DETECTION IN A PIPE NETWORK" incorporated herein by reference.

Further, in some embodiments, the sensors 14 and 16 can be coupled to smartphones (see below, smartphones 20 and 22) through an audio microphone input, as vibration sensors. The vibration sensor may be formed of a piezo element having a mass acting as an accelerometer or, alternatively, the sensor may have piezo element coupled to a liquid so that it functions as a hydrophone. In such configurations, the sensor generates electrical signals (charge or voltage) which can be amplified before the acquired signals are delivered onwards for further processing. Those skilled in the art will appreciate that such amplifiers are available from Texas Instruments (TLV1012). Other embodiments include inputs through a USB or Bluetooth ports.

The sensors 14 and 16 may utilize the above-mentioned USB or Bluetooth ports for coupling to other external mobile devices, such as smartphones 20 and 22, respectively. It should be borne in mind that while the illustrated embodiment describes the mobile devices as smartphones 20 and 22, respectively, the present technique as described herein is applicable to other types of mobile devices, such as tablets and other personal digital assistants PDAs. As such, the mobile devices as described herein include wireless communication capabilities, including but not limited to global position systems (GPS), cellular communications, wide-area communications (e.g., WiMax), local-area communications (e.g., WiFi), Bluetooth communications, and other short or long range radio frequency (RF) communications enabling the aforementioned mobile devices to communicate in various manners and be part of public and/or private networks, such as Internet, Ethernet, or other communications networks.

Further, the external coupling of the sensors 14 and 16 to the mobile devices (e.g., smartphones, tablets, PDAs) enables each of the aforementioned sensors to independently relay data acquired over time pertaining to possible or occurring leakages within the network. Thus, in some exemplary embodiments, the coupling between the sensors 14 and/or 16 and the respective smartphones 20 and 22 may be achieved through Bluetooth or other similar devices. Hence, the smartphones 20 and 22 may be couplable to local or wide area network hubs, such as hub 24, forming a WiFi, WiMax, Cellular and/or other wireless hubs. It should be borne in mind that the smartphones 20 and 22 include global positioning (GPS) devices adapted to provide location data for the devices 20 and 22, as well as time stamps for data that the smartphones 20 and 22 may acquire, relay or otherwise process.

In one embodiment, each of the smartphones 20 and 22 may utilize its GPS module for independently obtaining a time stamp from the GPS system. In so doing, each of the smartphones may do so by obtaining repeated time sample, through the GPS module, for ultimately obtaining multiple time measurements with a certain amount of time. Hence, by having such multiple time samples, each of the smartphones can effectuate certain prescribed algorithms (e.g., statistical analysis) on the sample for ultimately obtaining an accurate measurement of time between the two smartphones that is less than 5 ms. In so doing, the smartphones 20 and 22 may be said to be synchronized. As described below, the hub 24 and the network uniform and accurate sensor measurements can be obtained for determining the location of the leak with the pipe network 12.

Hence, as part of a network, the hub 24, may couple to one or more computing device, such as server 26, also part of the general electronic network to which the smartphones may connect. The hub 24 is adapted for providing the smartphones 20 and 22 a proper venue for connecting to information networks, such as the Internet, whereby data acquired by the sensor 14 and 16 may be transferred and gathered in a website of a vendor, client and/or an entity interested or otherwise responsible for monitoring leakages within the pipeline network. Further, the server 26 may include one or more processors adapted to process data, as well as perform various routines and algorithms, for example, such as those adapted to determine whether the pipeline network 12 has one or more leaks in one or more of its portions.

In an exemplary embodiment of the present technique, the leak 18 may be detected by using the smartphones 20 and 22 together with data received from the respective sensors 14 and 16. Because the varying distances at which the sensors 14 and 16 are located away from the leak 18, the time of arrival of signals due to the leak at each sensor may differ. Thus, for example, to triangulate the leak 18 from the signals acquired by each of the sensors 14 and 16, the acquired measurement signals at each of the sensor 14 and 16 may need to be coincident, in other words, the two signals arriving at the sensors may need to correspond temporally so as to achieve good correlation and accuracy in determining the location of the leak 18.

Hence, in one exemplary embodiment of the present technique, the server 26 can provide a uniform clock to both the smartphones 20 and 22 so that both devices are synchronized in time, thereby enabling devices 20 and 22 to provide correlated measurements of vibration signals obtained via the sensors 12 and 16. In so doing, each of the smartphones 20 and 22 can obtain repeated samples of each time within a certain duration. Upon achieving sufficient time samples, each of the smartphones can effect certain prescribed algorithms (e.g., statistical analysis) on the sample for ultimately obtaining an accurate measurement of time between the two smartphones that ranges between 2 ms-5 ms.

In another exemplary embodiment, the smartphones 20 and 22 can communicate with each other and operate, for example, in master-slave mode, respectively, so as to achieve the above synchronization. Still in another exemplary embodiment of the present technique, the smartphones 20 and 22 may each utilize their own respective GPS devices for obtaining a time synchronization, as well as, obtaining accurate location for further determining the location of the leak 18 within the pipeline 12. Hence, the synchronization achieved between the phones enables recording specific points in time, i.e., time stamps, of when measurements are to be taken from the sensors 14 and 16 so that the combined measurement is correlated, as be performed by the server 26 in processing the measurement data. In addition to time and position data transferred to the server 26, the smartphones 20 and 22 may also transfer data pertaining to the pipeline network itself including pipe properties (e.g., materials, sizes, capacity), pipeline topology and other physical properties.

In an exemplary embodiment, the smartphones 20 and 22 may form smartphones, each adapted to run applications tailored for transferring leakage data to the server 26. Such application may automatically, or at the discretion of the user achieve proper synchronization, as may be performed by the server 26, or as may be done between the phones 20 and 22 themselves so that measurement data obtained by each of the sensors 14 and 16 about the leak 18 is properly correlated in obtaining an accurate position of the leak 18. Thus, when performed by the server 26, applications of both of the smartphones 20 and 22 communicate with the server 26 to first achieve synchronization between the clock of the phones 20 and 22. In so doing, the server may set a point in time, instructing the phones 20 and 22 to start obtaining measurements from the sensors 14 and 16, respectively. Upon receiving synchronized measurements from each of the phones 20 and 22, the server 26 filters the received data signals and thereafter performs cross correlation between each of the signals arrived from each the phones 20 and 22 respectively. In so doing, the server 26 may execute certain routines and algorithms to, for example, find a maximum of the cross correlation function obtained from the measurements. Hence, those skilled in the art will appreciate that location of the leak can be obtained through various triangulation schemes.

Figure 2:
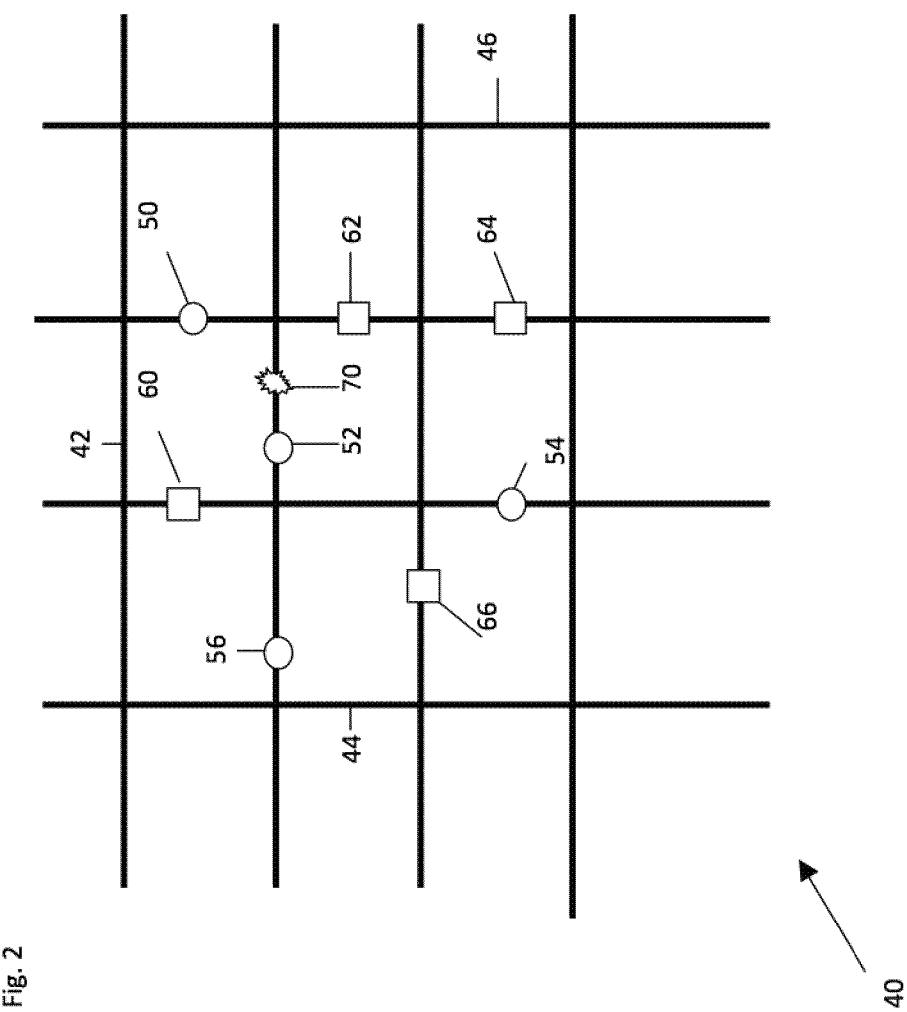
FIG. 2 illustrates another system for detecting leaks in a pipeline network, in accordance with an embodiment of the present technique.

FIG. 2 illustrates another system for detecting leaks in a pipeline network, in accordance with an embodiment of the present technique. Hence, there is shown a pipeline network 40 formed of, for example, a grid-like configuration of pipes 42, 44 and 46, all of which are adapted to carry one or more fluids between different points. While the illustrated exemplary network shows a particular type of topology, it should be borne in mind that the present techniques described herein can apply to networks of varying topologies. Further, the network 40 may be that of a city water system, sewer system or any network of pipes that maybe utilized by a city, town or other municipal organization.

As further illustrated, the network 40 includes a first plurality of sensors 50, 52, 54 and 56 adapted for detecting leaks within the network 40. The sensors 50-56 are permanently attached to the pipes of the network 40 and are part of a permanent detection system for detecting leaks or other malfunctions within the network 40. The fixed sensors 50-56 are generally wireless sensors (e.g., radio frequency (RF) or cellular). Hence, the sensors 50-56 may be connected to various wire-line or wireless communication systems adapted to relay data acquired by the sensors 50-56 about the state of the network as, for example, may occur if a leak within the network develops. Hence, the system of sensors 50-56 may also be adapted to provide continuous and periodic information about the state of the pipeline network 40 so that the network 40 is monitored on a regular basis by a central monitoring facility, such as those that may be employed by the municipality where in the network 40 is located.

The figure further illustrates a second plurality of sensors 60, 62, 64 and 66, adapted for monitoring the network 40 for any fluid leaks. The sensors 60-66 are mobile sensors and are also adapted to be coupled to mobile devices, such as the smartphones 20 and 22, described above with reference to FIG. 1, for relaying data that could provide indication of any leaks within the network 40. Similar to the sensors 50-56, the sensors 60-66 may also be physically coupled to the pipes of the network 40 and dispersed across the network at various place. Hence, the sensors 60-66 may be similar to the sensors 14 and 16 illustrated above with regards to FIG. 1. The use of smart phones 20 and 22 along with the sensors 60-66 may provide another layer of leak detection in addition to that provided by the system of sensors 50-56. Thus, for example, in a first mode of operation leak 70 may develop within or along the network 40. Accordingly, a first layer of detection can be provided by permanent sensors 50 and 52 which could, for example, utilize triangulation for locating the leak 70 up to some degree of certainty. To improve the accuracy, sensors 60 and 62 may operate in a manner to the sensors 14 and 16 described above to provide another layer of detection and thereby increase the accuracy of the location of the leak 70 within the network 40. Thus, respective smartphones may tap the sensors 60 and 62 to obtain data, i.e., vibration signals, time of arrival, GPS location and the like, which can be used to further pin-point the location of leak 70 to a greater accuracy. In this mode of operation, the smartphones 20 and 22 (coupled to the sensors 60 and 62, respectively) can each obtain repeated time signals through their respective GPS modules. As described above with reference to FIG. 1, the time samples obtained by each of the smartphones can be processed to obtain a very accurate time between the smartphones so that synchronous measurements can be taken from the sensors 60 and 62. Hence, the mobile sensors can provide additional location information pertaining to the leak 70. Such multi-layer detection of leaks within the network 40 can be achieved by combining data from various sources, such as that provided by the system of sensors 50-56 and that provided by the system of sensors 60-66 having mobile coupling capabilities. The data provided by the two detection systems can be combined and analyzed together by a central system, such as the server 26 to obtain greater accuracy of locating the leak 70.

In a second mode of operation, one or more fixed sensors, i.e., sensors 50-56 can be synchronized and/or correlated with one or more mobile sensors, i.e., sensors 60-66. Thus, for example, in order to obtain the location of the leak 70, fixed sensor 52 can be synchronized with mobile sensors 62 (using a smartphone coupled to the sensor 62) through the similar time sampling procedures mentioned above. In other words, the fixed sensor 52 may acquire repeated time sample signals either through GPS or through a central server, such as the server 26. Similarly, a smartphone, such as the smartphone 20 coupled to the mobile sensor 62, can also acquire time samples, whereby both the smartphone and sensor 52 can become synchronized after each device effects proper algorithms for obtaining an accurate time that is within or less than 5 ms between the devices, i.e., smartphone coupled to sensors 62 and fixed sensor 52. Once all the aforementioned devices are synchronized, measurements from the sensors 52 and 62 can be taken synchronously, so that those can be gathered and analyzed to provide an accurate location of the leak 70 disposed there between. Such analysis can be performed for example by a central computer, such as by one part of the server 26.

Hence, the ability to synchronize one or more sensors, i.e., sensors 50-56, of a fixed network with one or more mobile sensors, i.e., sensors 60-66, provide another multi-layer detection system that is flexible and versatile in detecting leaks across a pipeline network. Indeed, the ability to synchronize mobile sensors, through smartphones, with fixed sensors within the network provides a dynamic detection system that can adapt to varying conditions across the pipe network.

Figure 3:
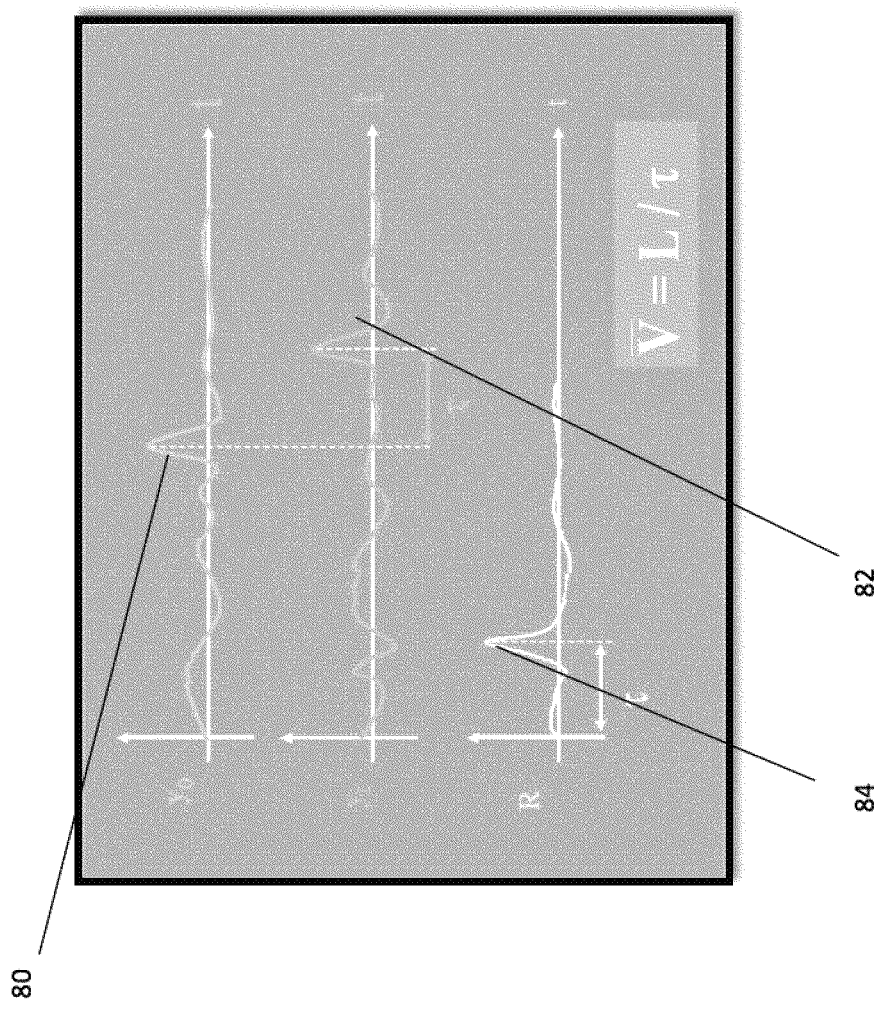
FIG. 3 illustrates signals for detecting a leak within a pipeline network, in accordance with an embodiment of the present technique.

FIG. 3 illustrates signals for detecting a leak within a pipeline network, in accordance with an embodiment of the present technique. As illustrated, a graph depicting vibration signals obtained from sensors, i.e., 14 and 16, for detecting the presence of a leak within a pipeline network, such as the network 12 and 40 described above. In the illustrated embodiment, signal 80 may be that of a first sensor, i.e., sensor 14 of FIG. 1, providing an output signal with a certain amplitude (as a function of time) possibly corresponding to a possible leak within the pipeline network. As further illustrated by FIG. 3, signal 82 is that of another sensor, i.e., sensor 16 as illustrated by FIG. 1, also providing an output signal of the a aforementioned leak. The signals 80 and 82 may be similar in amplitude, however, they are characterized by a time delay relative to one another because of the different position each sensors 14 and 16 has relative to the leak 18, in accordance with the relation V=L/T, where the speed of the signal is taken as the ratio of the distance from the leak and the time of arrival of the signal at the sensor.

It should be borne in mind that the cross correlation method described herein is exemplary and that other statistical methods can be employed for correlating two or more signals from the sensor 14 and 16. It should further be borne in mind that the above method for detecting leaks can be extended to employ more than two sensors in a pipeline network, such as the networks 12 and 40 described with reference to FIGS. 1 and 2, respectively. Hence, in such network multiple sensors, i.e., sensors 14 and 16, together with multiple smartphones, i.e., 20 and 22, can be utilized to gain very accurate locations of leaks within a pipeline network.

FIG. 4 is a block diagram of a method in accordance with an embodiment of the present technique. FIG. 4 describes a method for detecting leaks within a pipeline network, such as those described above. Accordingly, the method begins at block 100 in a first mobile device, i.e., smartphone, is coupled to a first sensor within the pipeline network, whereby the first sensor is adapted to detect leaks within the pipe network. The step of block 100 further includes coupling the first smartphone to a computer device, such as an application server located on a network and responsible for processing the data acquired by the sensors 14 and 16 for determining locations of leaks within the pipe network. At block 102, a second smartphone is coupled to a second sensor within the pipeline network, whereby the second sensor is also adapted to detect leaks within the pipe network. The step of block 102 further includes coupling the second smartphone to the application server. At block 104, the first and second smartphone are synchronized, and at block 106, the measurements obtained from the first and second sensors, respectively, are correlated for detecting a location of leak within the pipeline network.

Figure 5A:
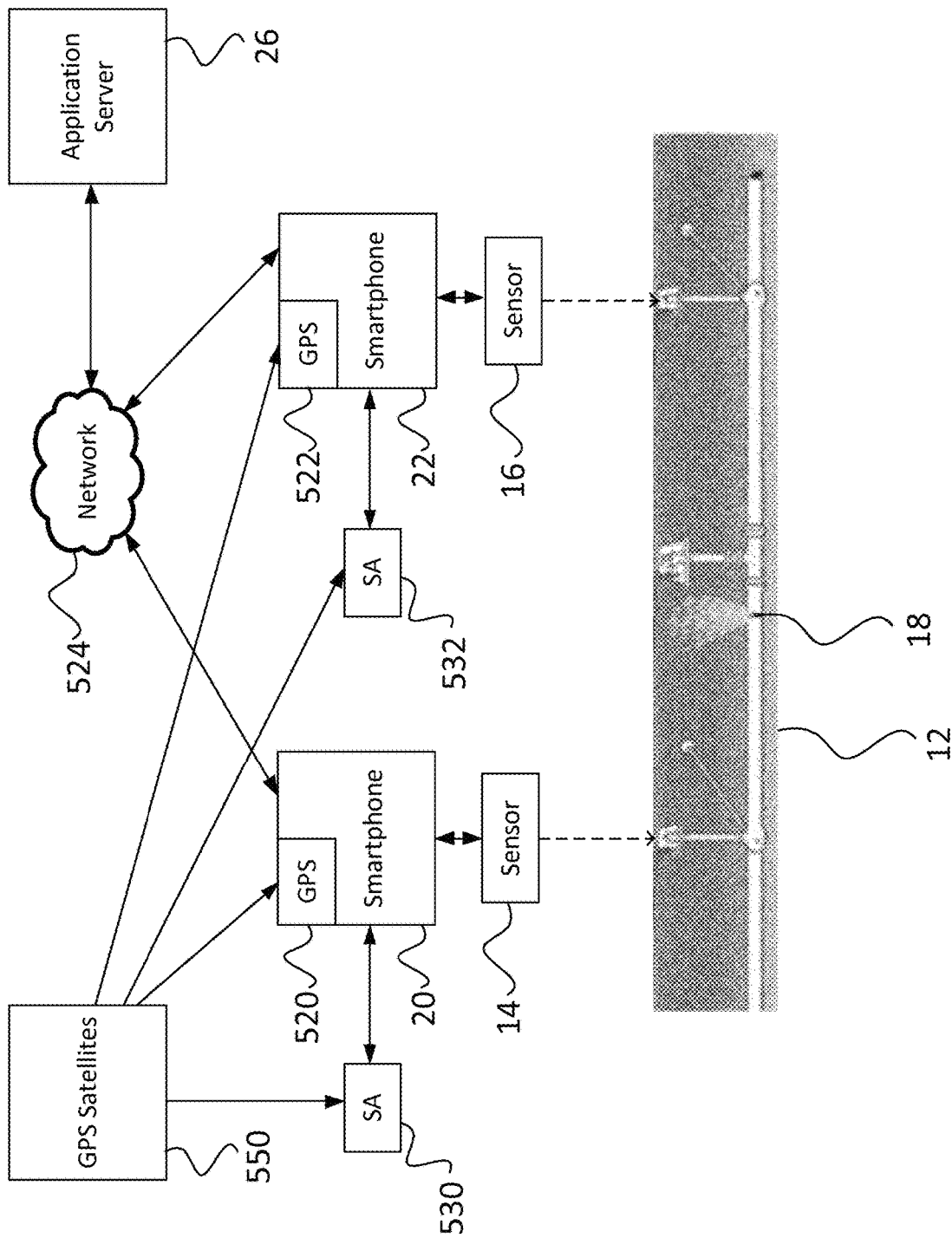
FIG. 5A illustrates a system for detecting locations of leaks in a pipeline network in accordance with some embodiments.

FIG. 5A illustrates a system for detecting locations of leaks in a pipeline network in accordance with some embodiments. As shown, pipeline network 12 consisting of a various pipes has a leak 18. Sensors 14 and 16 are provided with the ability to monitor and record measurements as to characteristics of the pipeline network 12. Sensors 14 and 16 may be vibration sensors. Sensors 14 and 16 may be other sensors in some embodiments. Smartphones 20 and 22 are provided containing GPS modules 520 and 522, respectively. In other embodiments, other mobile devices such as tablet computers may take the place of smartphones 20 and 22. Network 524 is provided. Network 524 may be a cellular communications network, a wide area network, a local area network, a combination of these networks, or some other type of network. Application server 26 is provided and performs processing of measurement data as well as other functions in the leak detection system. Synchronization adaptors 530 and 532 are provided. GPS satellites 550 are shown, where these are various satellites in the Global Positioning System within communication range of the smartphones 20 and 22.

As shown in FIG. 5A, sensors 14 and 16 are each capable of attaching to a portion of the pipeline network 12 (as shown by the dashed lines). This attaching may be a temporary attachment that allows sensors 14 and 16 to be easily attached to and detached from pipeline network 12 so that sensors 14 and 16 can be easily moved from one location along pipeline network 12 to another. As shown, sensors 14 and 16 communicate with smartphones 20 and 22, respectively. This communication may take a variety of forms. This communication may be facilitated using a wired USB connection between the sensors 14 and 16 and smartphones 20 and 22. This communication may be facilitated using a wireless Bluetooth connection between the sensors 14 and 16 and smartphones 20 and 22. The connection between sensors 14 and 16 and smartphones 20 and 22 is especially beneficial when the connection is performed using a short-range or short-distance communication medium. In this way, sensors 14 and 16 may transmit recorded measurements and perform other communications without needing to contain long-range or long-distance communication components.

As further shown in FIG. 5A, smartphones 20 and 22 communicate with application server 26 by way of network 524. Smartphones 20 and 22 may make use of long-range or long-distance communication mediums, such as cellular networks, in the form of network 524 in order to communicate with application server 26. In this way, sensors 14 and 16 communicating with smartphones 20 and 22 can be used at various locations along pipeline network 12 regardless of the location of application server 26.

As further shown in FIG. 5A, GPS modules 520 and 522 of smartphones 20 and 22, respectively, communicate with GPS satellites 550. Smartphones 20 and 22 may use GPS modules 520 and 522 for various purposes. Smartphones 20 and 22 may use GPS modules 520 and 522 to determine the location at which the smartphones 20 and 22 and the sensors 14 and 16 are located. By doing so, smartphones 20 and 22 may inform application server 26 as to what part of the pipeline network 12 is being monitored by sensors 14 and 16. Smartphones 20 and 22 may use GPS modules 520 and 522 to receive time information. GPS satellites can provide highly accurate time information. As such, smartphones 20 and 22 may use the time information provided by GPS satellites 550 by way of GPS modules 520 and 522.

As further shown in FIG. 5A, synchronization adaptors 530 and 532 communicate with smartphones 20 and 22, respectively. This communication may take a variety of forms. This communication may be facilitated using a wired USB connection between the sensors 14 and 16 and smartphones 20 and 22. This communication may be facilitated using a wireless Bluetooth connection between the sensors 14 and 16 and smartphones 20 and 22. This communication may be facilitated using a standard audio cable connected to an audio jack of the smartphones 20 and 22. This communication may be facilitated by substantially the same communication technology used to connect the sensors 14 and 16 to the smartphones 20 and 22, respectively. In addition, synchronization adaptors 530 and 532 communicate with GPS satellites 550. As such, synchronization adaptors 530 and 532 contain GPS modules. Synchronization adaptors 530 and 532 may use the signals received from GPS satellites 550 in order to output a highly accurate timing signal to the smartphones 20 and 22, respectively.

Figure 5B:
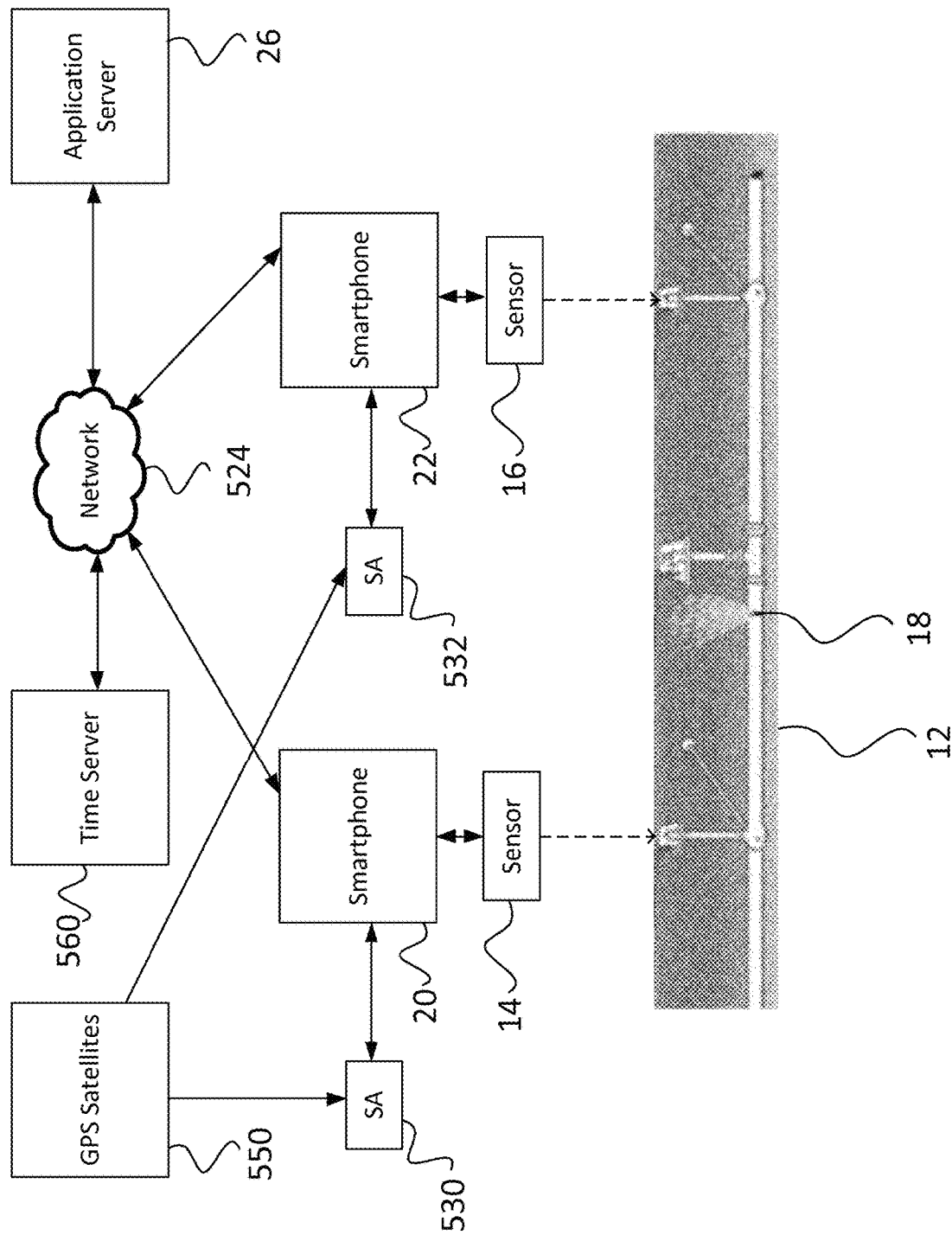
FIG. 5B illustrates a system for detecting locations of leaks in a pipeline network in accordance with some embodiments.

FIG. 5B illustrates a system for detecting locations of leaks in a pipeline network in accordance with some embodiments. FIG. 5B shows elements similar to those shown in the system of FIG. 5A. However, in FIG. 5B, a time server 560 is provided. While GPS modules 520 and 522 are not shown in FIG. 5B, GPS modules 520 and 522 may be used in embodiments also incorporating the time server 560 of FIG. 5B. As shown, smartphones 20 and 22 communicate with time server 560 by way of network 524. In the embodiments shown in FIG. 5B, network 524 is used by smartphones 20 and 22 to communicate with both application server 26 and time server 560. However, in other embodiments, smartphones 20 and 22 may communicate with time server 560 through a network different from the network used by smartphones 20 and 22 to communicate with application server 26. Time server 560 may provide time information to smartphones 20 and 22. For example, protocols such as the Network Time Protocol ("NTP") can be used in order to provide accurate time information from a server to client devices. Time server 560 may implement NTP in some embodiments. Time server 560 may use an alternative time distribution technique in other embodiments.

Figure 5C:
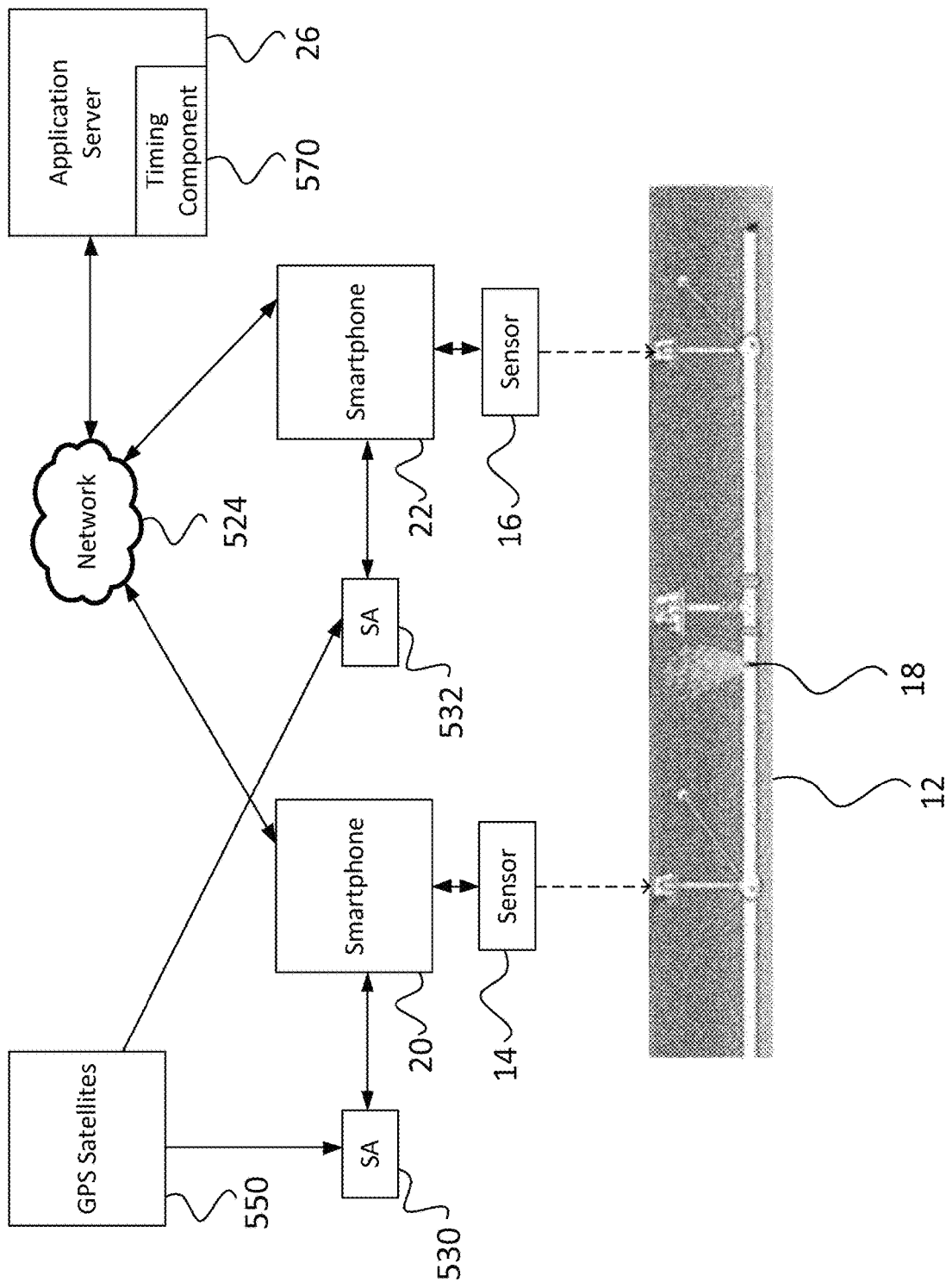
FIG. 5C illustrates a system for detecting locations of leaks in a pipeline network in accordance with some embodiments.

FIG. 5C illustrates a system for detecting locations of leaks in a pipeline network in accordance with some embodiments. FIG. 5C shows elements similar to those shown in the system of FIG. 5A and in the system of FIG. 5B. However, in FIG. 5C, application server 26 contains a timing component 570. In this embodiment, smartphones 20 and 22 communicate with application server 26 by way of network 524 for timing information in addition to any other communications that may be necessary with application server 26. In some embodiments, timing component 570 may be a software module on application server 26 providing. In some embodiments, timing component 570 may implement NTP or some other time distribution protocol for providing timing information to smartphones 20 and 22.

Figure 6A:
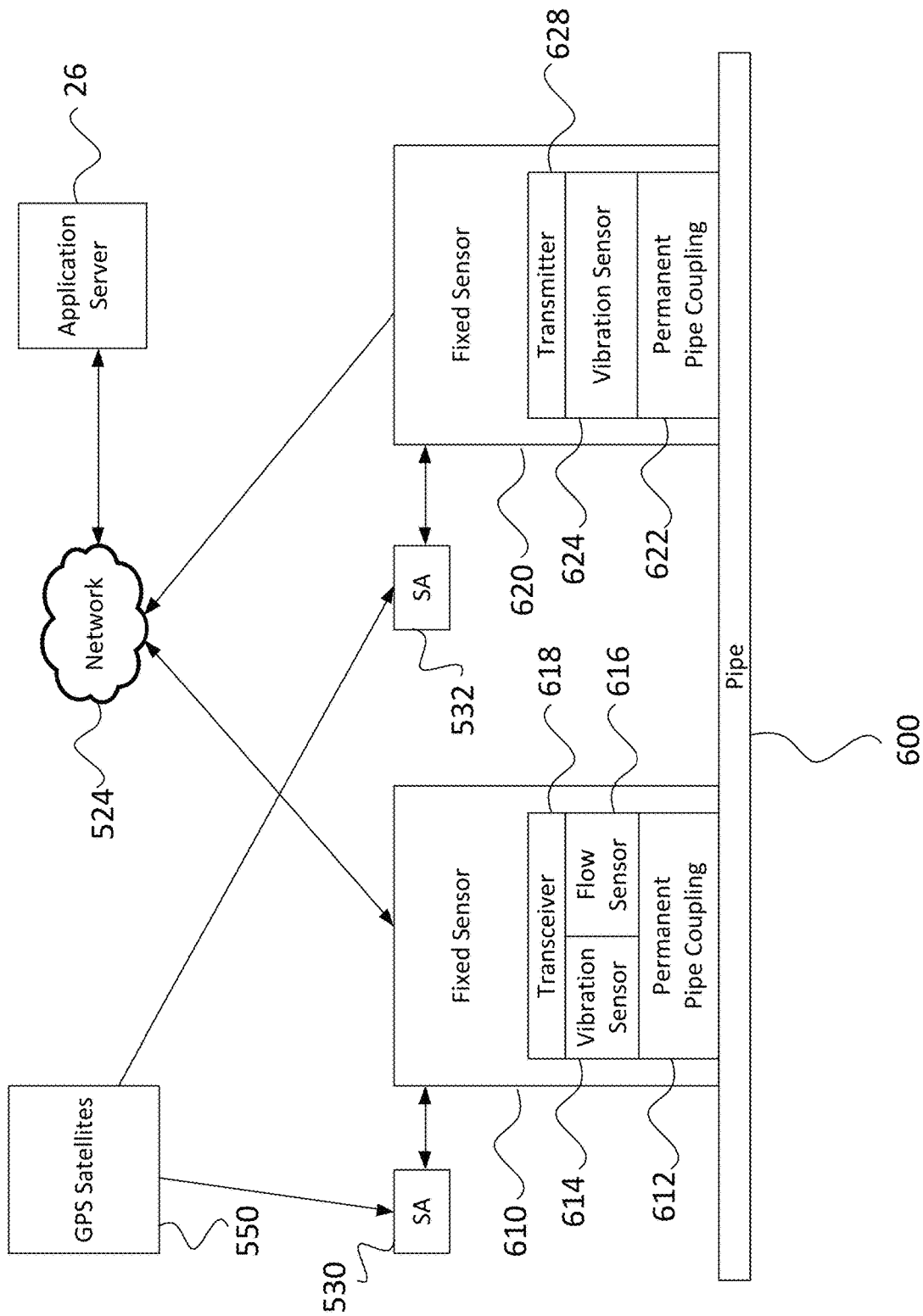
FIG. 6A illustrates the use of fixed sensors in a system for detecting locations of leaks in a pipeline network in accordance with some embodiments.

FIG. 6A illustrates the use of fixed sensors in a system for detecting locations of leaks in a pipeline network in accordance with some embodiments. As shown fixed sensors 610 and 620 are provided. Fixed sensor 610 has a permanent pipe coupling 612, a vibration sensor 614, a flow sensor 616, and a transceiver 618. Fixed sensor 612 has a permanent pipe coupling 622, a vibration sensor 624, and a transmitter 628. Fixed sensors 610 and 620 both communicate with application server 26 by way of network 524. Fixed sensors 610 and 620 communicate with synchronization adaptors 530 and 532, respectively, which in turn communicate with GPS satellites 550.

Permanent pipe couplings 612 and 622 may be provided so that fixed sensors 610 and 620 are permanently attached to a fixed location in the pipeline network. This permanent coupling may be provided in a variety of forms. The permanent coupling may entail providing a part of fixed sensors 610 and 620 in line with a pipe of the pipeline network. This approach may be particularly advantageous for fixed sensor 610, where the flow sensor may be provided in line with a pipe of the pipeline network so that a rate of flow of fluid in the pipe can be measured. In some embodiments, the permanent pipe couplings 612 and 622 include a mechanical coupling to pipe elements by the use of metal bands that ensure good contact between the pipe and the sensor. In some cases, these metal bands may also be useful in preventing unauthorized removal of the fixed sensors 610 and 620. In some embodiments, fixed sensors 610 and 620 are installed in underground pits, in which case permanent pipe couplings 612 and 622 may include a strong magnet that is effective to affix the fixed sensors 610 and 620 to the pipe.

Transceiver 618 and transmitter 628 may allow for long-range or long-distance communication with application server 26 via network 524. Network 524 may be a cellular network, a WiMAX network, or some other long-range network. In some embodiments, network 524 may be a wired network incorporating coaxial cabling. In some embodiments, network 524 may incorporate transmission of signals through the pipeline network using the pipes of the pipeline network as the signal carriers. Using the configuration shown in this figure, fixed sensors 610 and 620 having the capability to communicate through network 524 with application server 26 without the need to attach any additional computing device such as a smartphone.

Figure 6B:
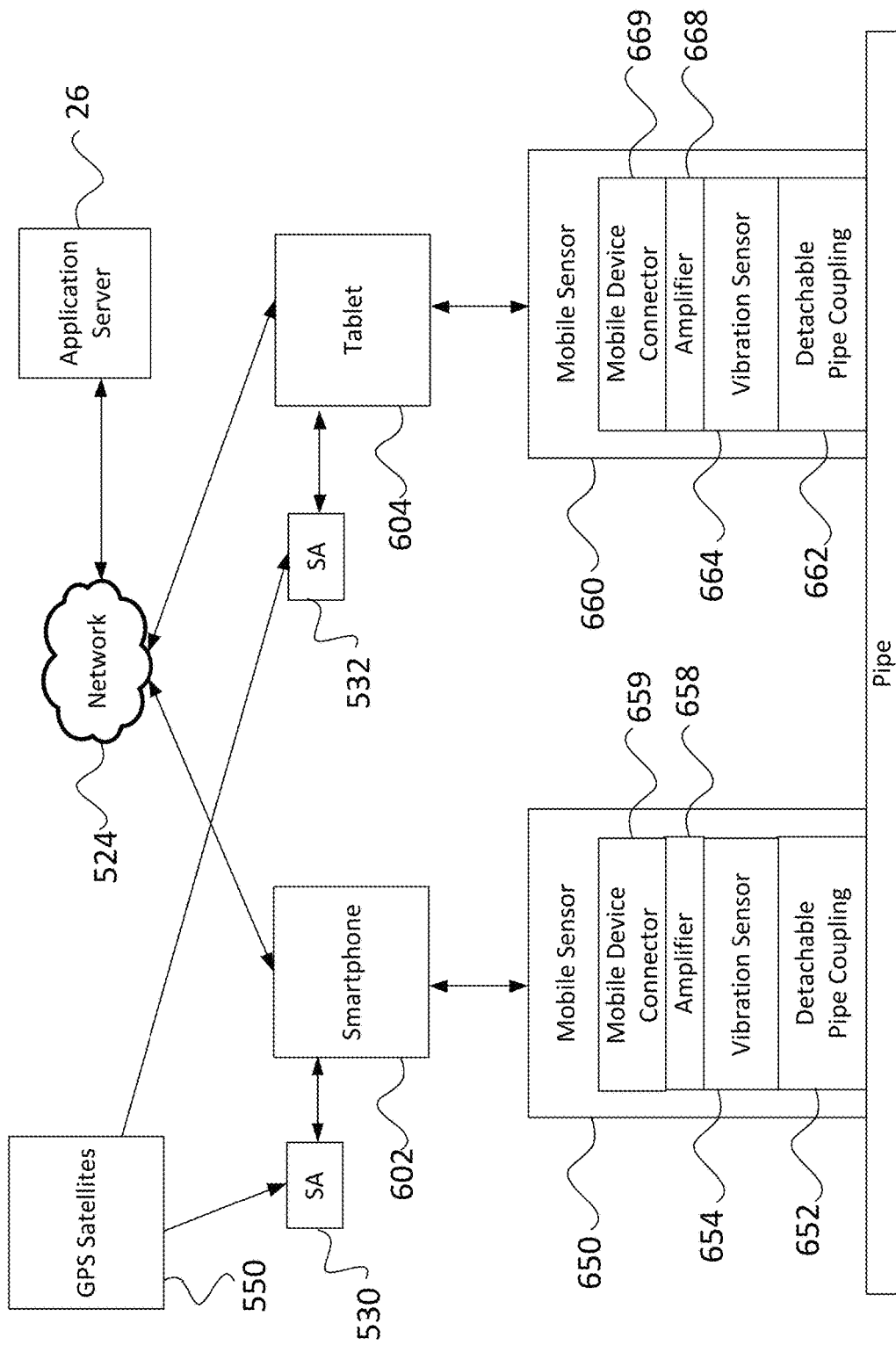
FIG. 6B illustrates the use of mobile sensors in a system for detecting locations of leaks in a pipeline network in accordance with some embodiments.

FIG. 6B illustrates the use of mobile sensors in a system for detecting locations of leaks in a pipeline network in accordance with some embodiments. As shown, mobile sensors 650 and 660 are provided. Mobile sensor 650 has a detachable pipe coupling 652, a vibration sensor 654, an amplifier 658, and a mobile device connector 659. Mobile sensor 660 has a detachable pipe coupling 662, a vibration sensor 664, an amplifier 668, and a mobile device connector 669. Mobile sensors 650 and 660 communicate with smartphone 602 and tablet 604, respectively. Smartphone 602 and tablet 604 both communicate with application server 26 by way of network 524. Smartphone 602 and tablet 604 communicate with synchronization adaptors 530 and 532, respectively, which in turn communicate with GPS satellites 550.

Detachable pipe couplings 652 and 662 may be provided so that mobile sensors 650 and 660 are can be easily attached and then unattached to a particular location in the pipeline network. This detachable coupling may be provided in a variety of forms. Detachable pipe couplings 652 and 662 may be provided as a magnet. The magnet of detachable pipe couplings 652 and 662 may allow mobile sensors 650 and 660 to be attached to any metal element of a pipe in the pipeline network. Detachable pipe couplings 652 and 662 may entail pressing a surface of mobile sensors 650 and 660 on a surface of pipe 600. Detachable pipe couplings 652 and 662 may entail pressing a surface of mobile sensors 650 or 660 on a surface of pipe 600 and then using a strap attached to mobile sensors 650 and 660 to securely fasten mobile sensors 650 and 660 to the surface of pipe 600. Detachable pipe couplings 652 and 662 may include one or more pairs of spring-resistance clamping arms, so that mobile sensors 650 and 660 may be firmly attached to pipe 600 by placing the clamping arms around the surface of pipe 600. Detachable pipe couplings 652 and 662 may include a fitting attached to or provided as part of sensors 650 and 660 that securely connects to a separate fitting provided securely fastened to pipe 600. The sensor is connected to the smart phone via a cable like to the audio jack.

Mobile sensors 650 and 660 may communicate with smartphone 602 and tablet 604 using a variety of communication technologies. In some embodiments, mobile sensors 650 and 660 may be connected using a standard audio cable to the audio port or audio jack of smartphone 602 and tablet 604. Such a configuration may be particularly advantageous when mobile sensors 650 and 660 include vibration sensors or hydrophones. Accordingly, mobile device connectors 659 and 669 may be a wired connection to an audio cable. The audio cable may then be connected to an audio jack of smartphone 602 and tablet 604. In such embodiments, a signal generated by a vibration sensor or a hydrophone in mobile sensors 650 or 660 may be passed along the audio cable to the smartphone 602 and tablet 604. In such embodiments, the sensor signal generated by the mobile sensor may first be amplified by amplifiers 658 and 668 before being transmitted to smartphone 602 and tablet 604.

In some embodiments, mobile sensors 650 and 660 may communicate with smartphone 602 and tablet 604 using short-range or short-distance transmission, such as with Bluetooth or WiFi, so that mobile sensors 650 and 660 do not need to contain long-range or long-distance transmission capabilities. Additionally, mobile device connectors 659 and 669 may provide a hardware interface to connect mobile sensors 650 and 660 to smartphone 602 and tablet 604. Mobile device connectors 659 and 669 may be a USB port allowing the use of a USB cable to connect mobile sensors 650 and 660 with smartphone 602 and tablet 604. Mobile device connectors 659 and 669 may be a variety of other hardware interfaces in other embodiments.

Figure 6C:
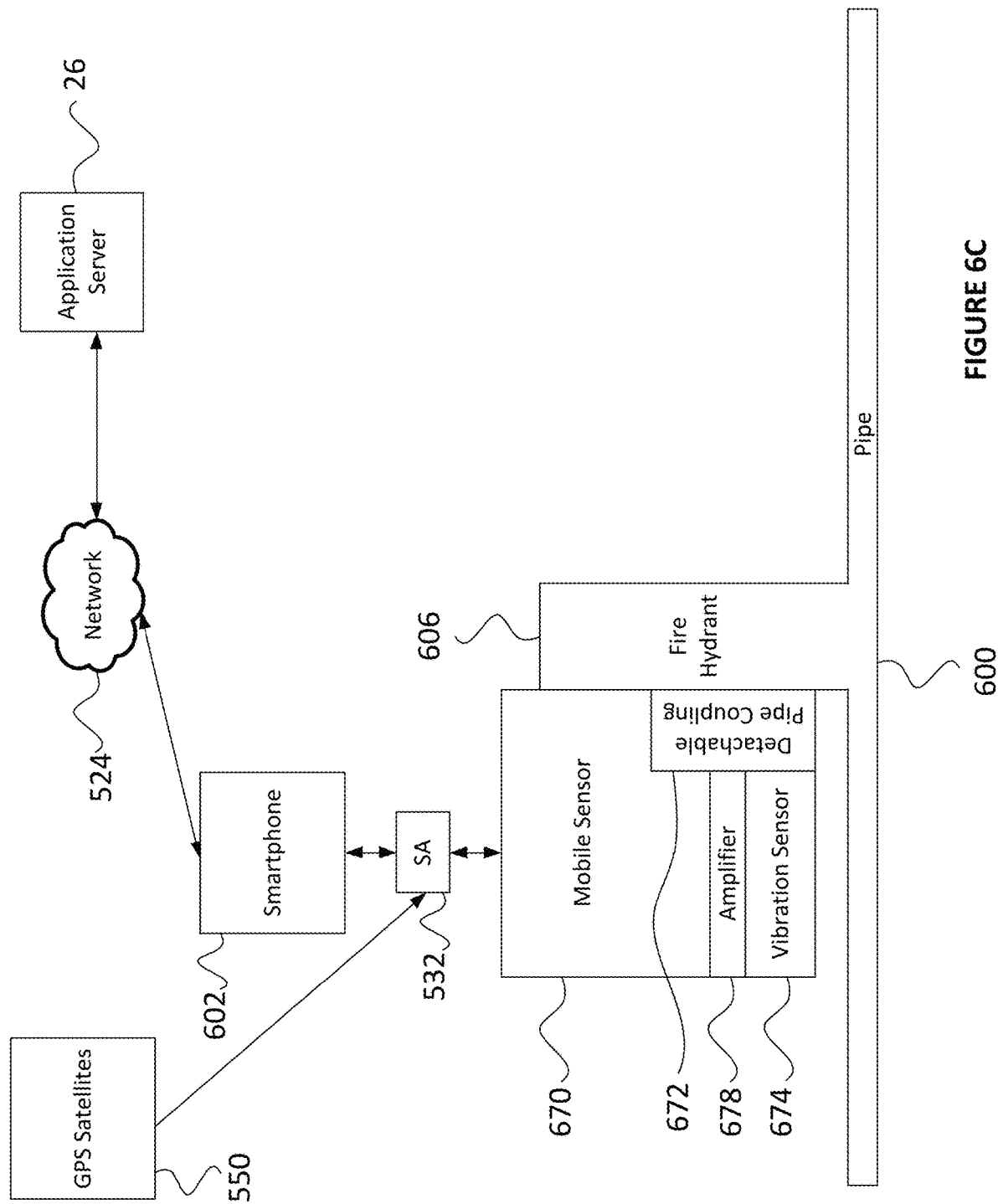
FIG. 6C illustrates the use of mobile sensors in a system for detecting locations of leaks in a pipeline network in accordance with some embodiments.

FIG. 6C illustrates the use of mobile sensors in a system for detecting locations of leaks in a pipeline network in accordance with some embodiments. As shown, mobile sensor 670 is provided. Mobile sensor 670 has a detachable pipe coupling 672, a vibration sensor 674, and an amplifier 678. Mobile sensor 670 is connected with synchronization adaptor 530. Synchronization adaptor 530 is connected with smartphone 602. Synchronization adaptor 530 is further in communication with GPS Satellites 550. Smartphone 602 communicates with application server 26 by way of network 524. The features of mobile sensors 670 may be substantially similar to the features described for mobile sensors 650 and 660. However, as shown, detachable pipe coupling 670 is attached to a fire hydrant 606 that is attached to pipe 600. This embodiment may be advantageous for allowing easy attachment of mobile sensor 670 to the pipeline network when pipe 600 and other pipes in the pipeline network are inaccessible, such as being buried underground. Detachable pipe coupling 672 may be provided in similar ways as those described for detachable pipe coupling 652 and 662. Additionally, detachable pipe coupling 672 may be provided to be connected to a valve of fire hydrant 606 or any other pipe element. Based on the configuration shown, mobile sensor 670 may communicate sensor readings to synchronization adaptor 530. Synchronization adaptor 530 may then communicate those sensor readings as well as a timing synchronization signal to smartphone 602. The timing synchronization signal may be generated based on a signal received from GPS satellites 550.

Figure 6D:
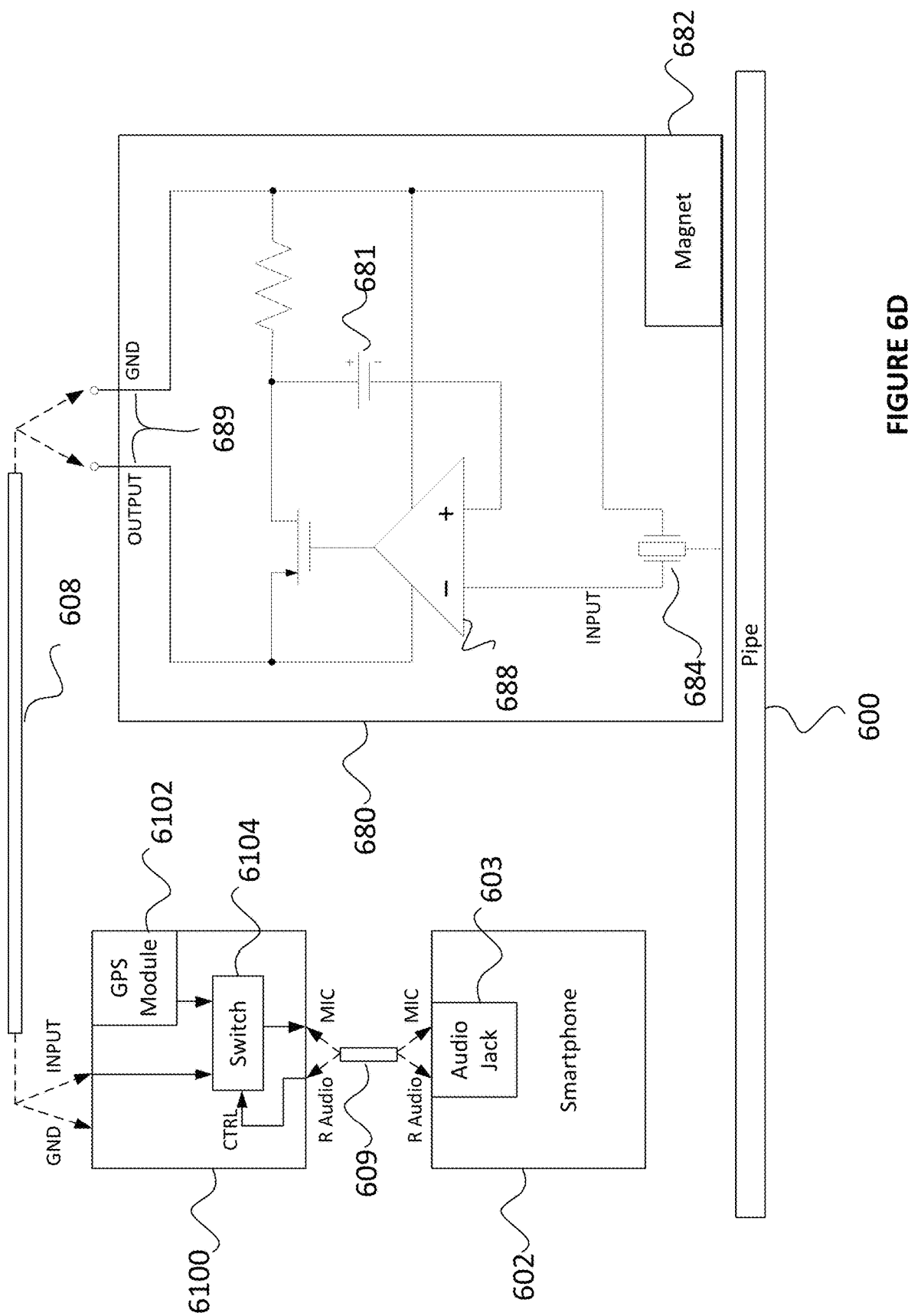
FIG. 6D illustrates the use of a mobile sensor in a system for detecting locations of leaks in a pipeline network in accordance with some embodiments.

FIG. 6D illustrates the use of a mobile sensor in a system for detecting locations of leaks in a pipeline network in accordance with some embodiments. As shown, mobile sensor 680, synchronization adaptor 6100, and smartphone 602 are provided.

Mobile sensor 680 contains various components. Mobile sensor 680 contains a magnet 682. Magnet 682 serves as a detachable pipe coupling in order to couple mobile sensor 680 to a surface of pipe 600. Mobile sensor 680 contains piezoelectric vibration sensor 684, which performs as a vibration sensor. Sensor signals generated by piezoelectric vibration sensor 684 are transmitted as INPUT to amplifier 688. The amplified sensor signals are transmitted to an OUTPUT terminal that is part of mobile device connector 689. Mobile device connector 689 further contains a GND terminal for receiving a ground voltage. Mobile device 680 further contains a battery 681 for providing electrical power to amplifier 688 and other elements of mobile sensor 680. An electrical cable 608 is connected to the mobile device connector 689 of the mobile sensor 680.

Synchronization adaptor 6100 contains various components. The electrical cable 608 is connected to GND and INPUT ports on synchronization adaptor 6100. Synchronization adaptor 6100 contains a GPS module 6102 that may be in communication with GPS satellites. Synchronization adaptor 6100 contains a switch 6104 that receives the signal from the INPUT port of synchronization adaptor 6100 and a signal from GPS module 6102. The switch 6104 outputs a signal to a MIC (microphone) output. The switch 6104 receives a CTRL (control) signal from a R Audio (right audio) input. Alternatively, a left audio input can be used. In some embodiments the CTRL signal may be a two state signal, such as a 4 kHz signal transmitted continuously to the R audio input (state 1) or no signal at all (state 2). The MIC output and R Audio input are connected to wire electrical wire 609.

The smartphone 602 contains various components. The electrical cable 609 is connected to a MIC input of an audio jack 603 of smartphone 602. The smartphone 602 may provide a signal to an R Audio output of the audio jack 603, which may be used by synchronization adaptor 6100 as a control signal for switch 6104. Through these connections, piezoelectric vibration sensor 684 generates sensor signals which are then amplified by amplifier 688 and transmitted via electrical cable 608 to synchronization adaptor 6100, which then transmits the sensor signals and timing synchronization signals via electrical cable 609 to smartphone 602 via an audio jack 603.

Though not shown, the synchronization adaptor 6100 may contain other components necessary or convenient for its operation. For instance, the synchronization adaptor 6100 may contain a power source for powering the GPS module 6102 and other components. The synchronization adaptor 6100 may contain a rectifier for converting an analog control signal transmitted on the R Audio input to a digital control signal for input into the switch 6104.

In some embodiments, mobile sensor 680 may not have a battery 681. In such embodiments, mobile sensor 680 may use an electrical power received from smartphone 603 and synchronization adaptor 6100 via electrical cable 608 to provide power to amplifier 688 and other elements of mobile device 680.

The mobile sensor 680, electrical cable 608, synchronization adaptor 6100, electrical cable 609, and smartphone 602 as configured in the exemplary embodiment of this figure advantageously allow use of standard equipment for detecting leaks in a pipeline network. Smartphone 603 may be a standard smartphone, and audio jack 603 may be a standard audio input/output port on smartphone 602. It is common in the art to provide a mobile device, such as a smartphone or a tablet, with an audio jack. This audio jack may provide both stereo audio output from the mobile device as well as microphone audio input to the mobile device. It is common to provide four distinct electrical signals using an audio cable connected to the audio jack: a left audio output signal (L Audio) (from the mobile device), a right audio output signal (R Audio) (from the mobile device), a ground voltage signal (GND), and an audio input signal (MIC) (to the mobile device). In such cases, the audio cable may be attached to an audio output device, such as headphones, as well as an audio input device, such as a microphone built into a node along the audio cable. Given such standard constructions, electrical cables 608 and 609 may be a standard audio cable or a specially made electrical cable that connects to smartphone 602 using the audio jack 603 in the ordinary fashion. In this way, only the mobile sensor 680 and synchronization adaptor 6100 may need be specially manufactured, though electrical cables 608 and 609 may also be specially manufactured. A system using the exemplary embodiments shown in this figure may then use a software application running on smartphone 602 to process and/or store the received amplified sensor signals. As such, the software application may then cause smartphone 602 to transmit the sensor signals to an application server using the standard telecommunications technology of the smartphone 602, such as using the cellular network capabilities of the smartphone 602.

Figure 6E:
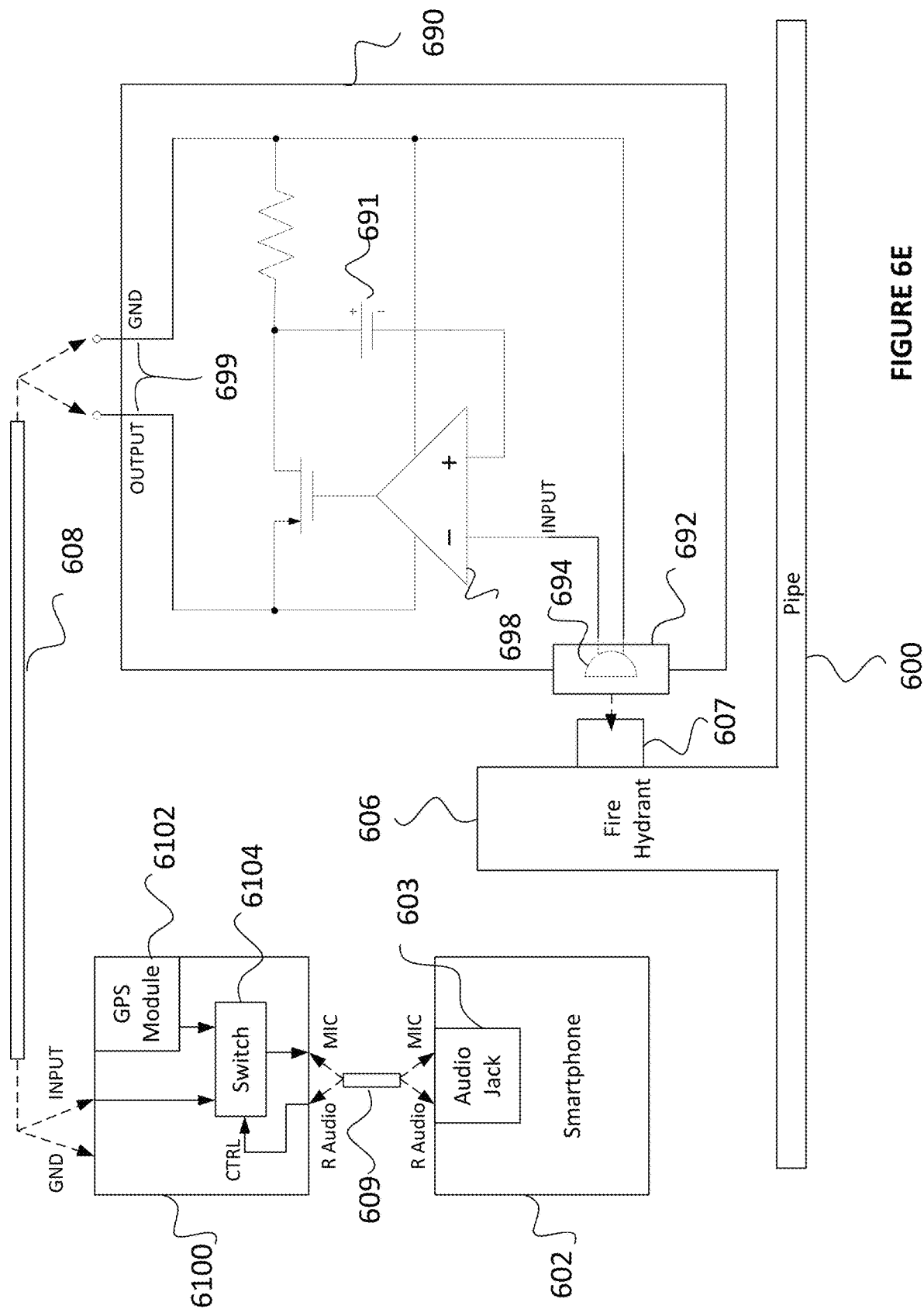
FIG. 6E illustrates the use of a mobile sensor in a system for detecting locations of leaks in a pipeline network in accordance with some embodiments.

FIG. 6E illustrates the use of a mobile sensor in a system for detecting locations of leaks in a pipeline network in accordance with some embodiments. As shown, mobile sensor 690, synchronization adaptor 6100, and smartphone 602 are provided.

Mobile sensor 690 contains various components. Mobile sensor 690 contains a valve fitting 692 for securely connecting to a valve 607 provided on fire hydrant 606. Valve fitting 692 serves as a detachable pipe coupling in order to couple mobile sensor 690 to fire hydrant 606. Use of valve fitting 692 may be particularly advantageous where the pipes of the pipeline network are plastic, thereby making use of a magnet ineffective for coupling the mobile sensor to the pipes. Use of valve fitting 692 may additionally be advantageous in any situation where valves are provided on pipes of the pipeline network, thereby providing a secure way to couple the mobile sensor to the pipes. Mobile sensor 690 contains hydrophone 694. Sensor signals generated by hydrophone 694 are transmitted as INPUT to amplifier 698. The amplified sensor signals are transmitted to an OUTPUT terminal that is part of mobile device connector 699. Mobile device connector 699 further contains a GND terminal for receiving a ground voltage. Mobile device 690 further contains a battery 691 for providing electrical power to amplifier 698 and other elements of mobile sensor 690. An electrical cable 608 is connected to the mobile device connector 699 of the mobile sensor 690.

Synchronization adaptor 6100 contains various components. The electrical cable 608 is connected to GND and INPUT ports on synchronization adaptor 6100. Synchronization adaptor 6100 contains a GPS module 6102 that may be in communication with GPS satellites. Synchronization adaptor 6100 contains a switch 6104 that receives the signal from the INPUT port of synchronization adaptor 6100 and a signal from GPS module 6102. The switch 6104 outputs a signal to a MIC (microphone) output. The switch 6104 receives a CTRL (control) signal from a R Audio (right audio) input. Alternatively, a left audio input can be used. The MIC output and R Audio input are connected to wire electrical wire 609.

The smartphone 602 contains various components. The electrical cable 609 is connected to a MIC input of an audio jack 603 of smartphone 602. The smartphone 602 may provide a signal to an R Audio output of the audio jack 603, which may be used by synchronization adaptor 6100 as a control signal for switch 6104. Through these connections, hydrophone 690 generates sensor signals which are then amplified by amplifier 698 and transmitted via electrical cable 608 to synchronization adaptor 6100, which then transmits the sensor signals and timing synchronization signals via electrical cable 609 to smartphone 602 via an audio jack 603.

In some embodiments, mobile sensor 690 may not have a battery 691. In such embodiments, mobile sensor 690 may use an electrical power received from smartphone 603 and synchronization adaptor 6100 via electrical cable 608 to provide power to amplifier 698 and other elements of mobile device 690.

Figure 7:
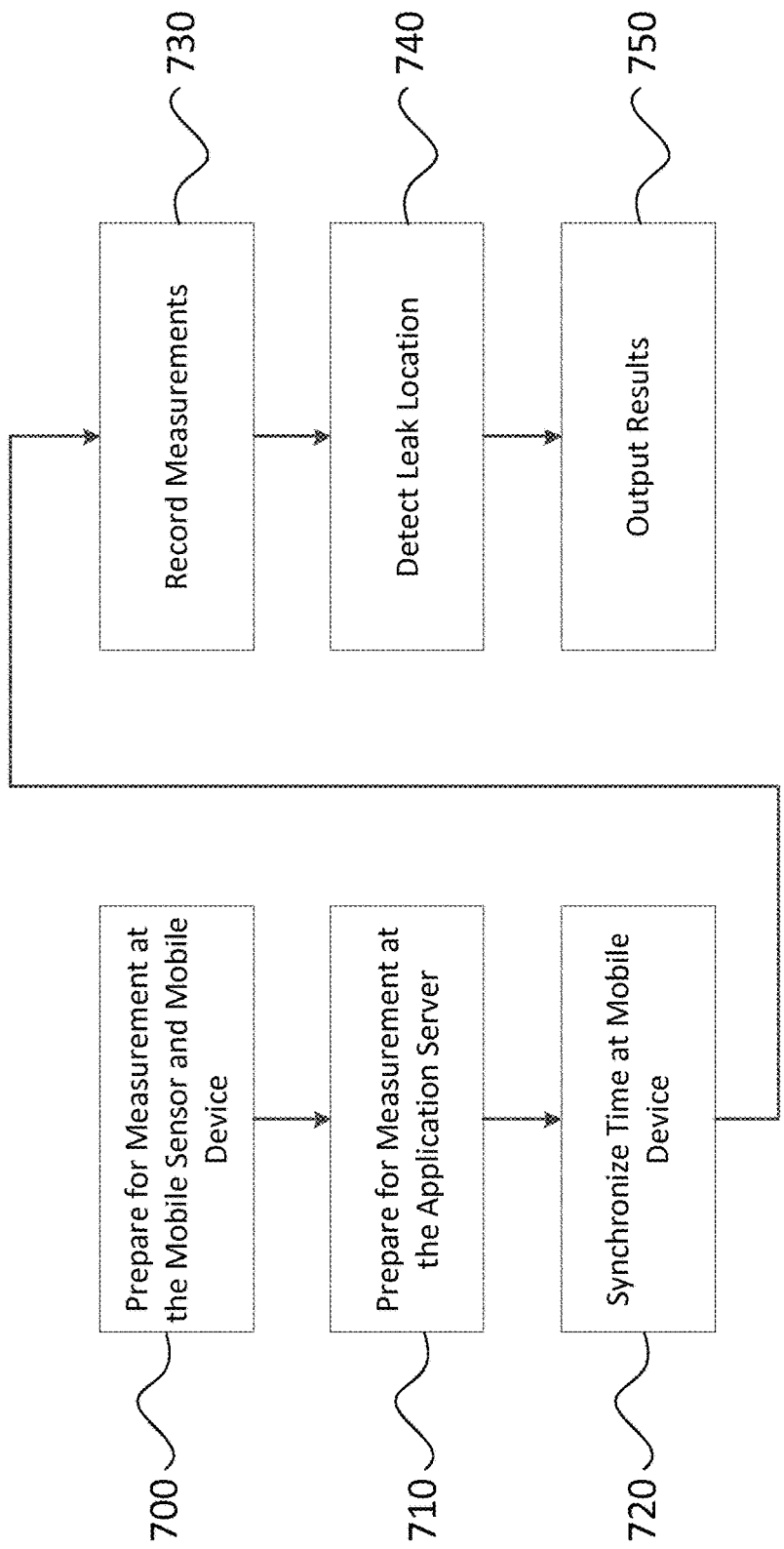
FIG. 7 shows a flowchart for a method of detecting location of leaks in a pipeline network in accordance with some embodiments.

FIG. 7 shows a flowchart for a method of detecting location of leaks in a pipeline network in accordance with some embodiments. The process begins at step 700. At step 700, preparation for measurement is performed at mobile sensors and mobile devices. This step may entail a variety of steps that place mobile sensors and attached mobile devices in a state of readiness for beginning sensor measurements.

The process continues at step 710. At step 710, preparation for measurement is performed at an application server. The application server may perform a variety of functions at this step, such as coordinating a measurement time and measurement period for the mobile devices and mobile sensors.

The process continues at step 720. At step 720, synchronization of time is performed at the local devices. This may entail a variety of steps performed at the mobile devices with the purpose of coordinating the mobile sensors to begin recording sensor measurements at the same time. Embodiments of this method may use techniques for leak detection where the techniques are subject to error if the sensor measurements are not recorded in sync with one another. Therefore, the mobile devices may together or independently perform functions that attempt to synchronize the beginning of sensor measurement recording with the other mobile sensors.

The process continues at step 730. At step 730, the mobile sensors and mobile devices record sensor measurements. This may entail the mobile sensor observing sensors readings and then storing those readings in temporary or permanent storage on the mobile sensor or the mobile device. This step may also entail transmitting in real-time, in blocks, or in a single batch the recorded sensor measurements to the application server.

The process continues at step 740. At step 740, the application server processes the sensor measurements provided by the mobile sensors and mobile devices. This processing may entail performing cross-correlation analysis as previously described with respect to FIG. 3. At the end of this step, application server has produced an estimate of the location of a leak in the pipeline network, where that estimate may have varying degrees of accuracy. The application server may express this estimated leak location as a geographic location, as a geographic location accompanied by a confidence measure for the estimate, as a range of a pipe in the pipeline network accompanied by a confidence measure for the estimate, as a set of ranges of pipes in the pipeline network, as a geographic area spanning the pipeline network, or as some other type of leak location estimate.

The process continues at step 750. At step 750, the application server outputs results based on the processing of the sensor measurements and the estimate of the leak location. This output may take a variety of forms, such as storing the estimated leak location on a non-transitory storage device, sending a notification of the estimated leak location to the handheld devices, sending a notification of the estimated leak location to a computer in an operating center, or as some other form of output.

FIG. 8 shows a flowchart for a method for preparing for measurement at a mobile sensor and mobile device in accordance with some embodiments. The process begins at step 800. At step 800, an operator of the mobile device and mobile sensor transports the mobile device and mobile sensor to a location on the pipeline network where the mobile sensor will be connected. The operator may move to this location based on instructions from the application server for a location of attachment for the mobile sensor.

The process continues at step 802. At step 802, the operator connects the mobile sensor to the mobile device. This connection may be performed in a variety of ways in various embodiments. For instance, the operator may use a USB cable to connect the mobile sensor to the mobile device. Alternatively, the operator may power on the mobile sensor, at which point the mobile sensor begins communicating via Bluetooth with the mobile device. Alternatively, the mobile sensor may already be powered on, and the operator opens an application on the mobile device to initiate the wireless connection between the mobile device and the mobile sensor. It should be noted that this step may be performed earlier or later in the process as is convenient.

The process continues at step 804. At step 804, the operator launches an application on the mobile device. This application may be a software application that provides the operator with various types of functionality related to the leak detection system.

The process continues at step 806. At step 806, the operator attaches the mobile sensor to the pipeline network. This attachment may be performed by attaching the mobile sensor to a pipe in the pipeline network. This attachment may be performed by attaching the mobile sensor to a fire hydrant in the pipeline network. Various ways in which the mobile sensor may be attached to the pipeline network are described with respect to the preceding figures. It should be noted that this step may be performed earlier or later in the process as is convenient.

The process continues at step 808. At step 808, the operator presses a "Ready" button provided in the application running on the mobile device. At this step, the operator has the mobile device in place and ready for sensor measurement, so the operator presses the "Ready" button to indicate to the application that the sensor is ready for measurement. Various other techniques may be used to allow the operator to communicate the ready status of the sensor to the application.

The process continues at step 810. At step 810, the application on the mobile device causes the mobile devices to transmit the ready status of the mobile sensor to the application server. This may be performed using a variety of telecommunications channels, such as WiFi and cellular networks, as described with respect to the preceding figures. In addition to the ready status, the mobile device may transmit other useful information, such as the geographic location of the mobile sensor and the mobile device. The mobile device may transmit some unique identifier that identifies the mobile device uniquely with respect to the other mobile devices.

Figure 9A:
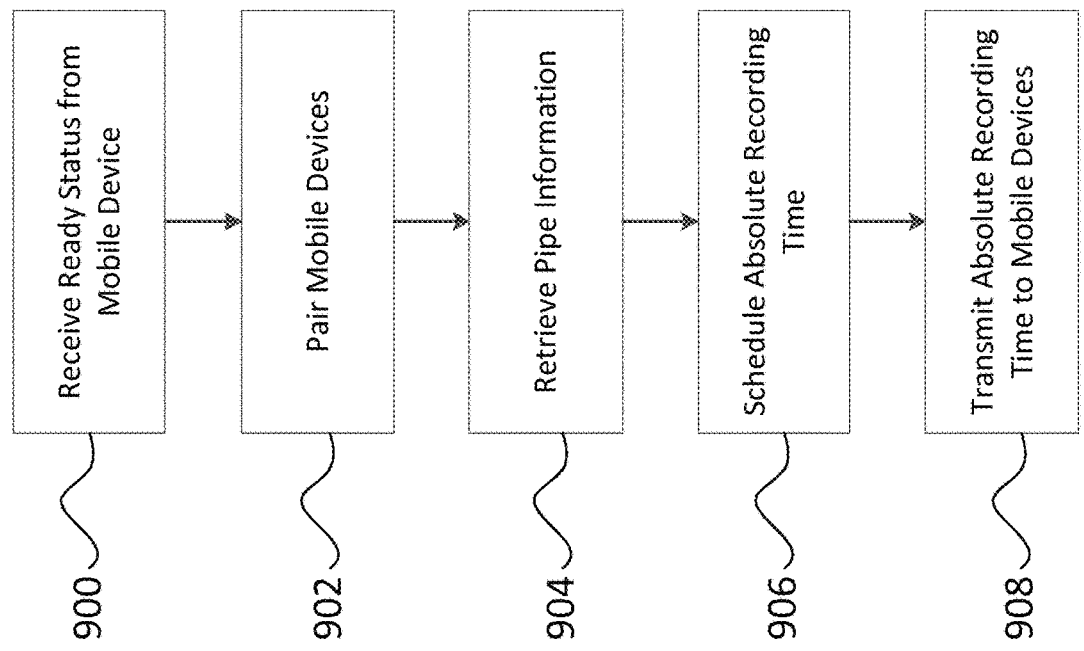
FIG. 9A shows a flowchart for a method for preparing for measurement at an application server in accordance with some embodiments.

FIG. 9A shows a flowchart for a method for preparing for measurement at an application server in accordance with some embodiments. The process begins at step 900. At step 900, the application server receives the ready status indicator from the mobile device.

The process continues at step 902. At step 902, the application server pairs mobile devices together for the purposes of recording sensor measurements. The mobile device pairing involves the placing of two or more mobile devices into a group. All members of the group may then perform sensor measurement recording at a synchronized start time. Further detail on how the application server may pair mobile devices in some embodiments is described with respect to the following figures.

The process continues at step 904. At step 904, the application server retrieves pipe information. As previously described, the characteristics of the pipe, such as pipe material, surrounding material, pipe diameter, fluid contents, etc., may have an effect on the sensor measurements received by the mobile sensor. As such, the application server retrieves information about the portion of the pipe at which the mobile sensor and mobile device are located so as to appropriately factor this information into the later sensor measurement processing. The application server may perform the retrieval by using the geographic location information transmitted by the mobile device and received by the application server. It should be noted that this step may be performed earlier or later in the process as is convenient. Further detail on how the application server retrieves the pipe information in some embodiments is described with respect to the following figures.

The process continues at step 906. At step 906, the application server schedules an absolute recording time for all mobile sensors in the pairing. The absolute time as scheduled by the application server is a single point in time when all mobile sensors in the pairing should begin recording sensor measurement. This time is referred to as "absolute" in the sense that it denotes the time on a "true" clock, i.e., one without local offset from the true time, when the recording should begin. The scheduling in this step may further include a specified duration for the sensor measurement recording. The application server may select the absolute recording time using a variety of techniques. For instance, the application server may avoid scheduling an absolute recording time any earlier than 10 minutes in the future, so that additional preparation such as time synchronization can be performed at the mobile devices. Additionally, the application server may avoid scheduling an absolute recording time any later than 1 hour in the future, so that the operators of the mobile devices do not need to wait at the mobile sensor attachment locations for an extended period of time. Other rules and heuristics may be used by the application server in selecting an absolute recording time.

The process continues at step 908. At step 908, the application server transmits the absolute recording time to the mobile devices. This transmission may be accompanied by other information as necessary to allow the mobile devices to prepare for sensor measurement recording.

Figure 9B:
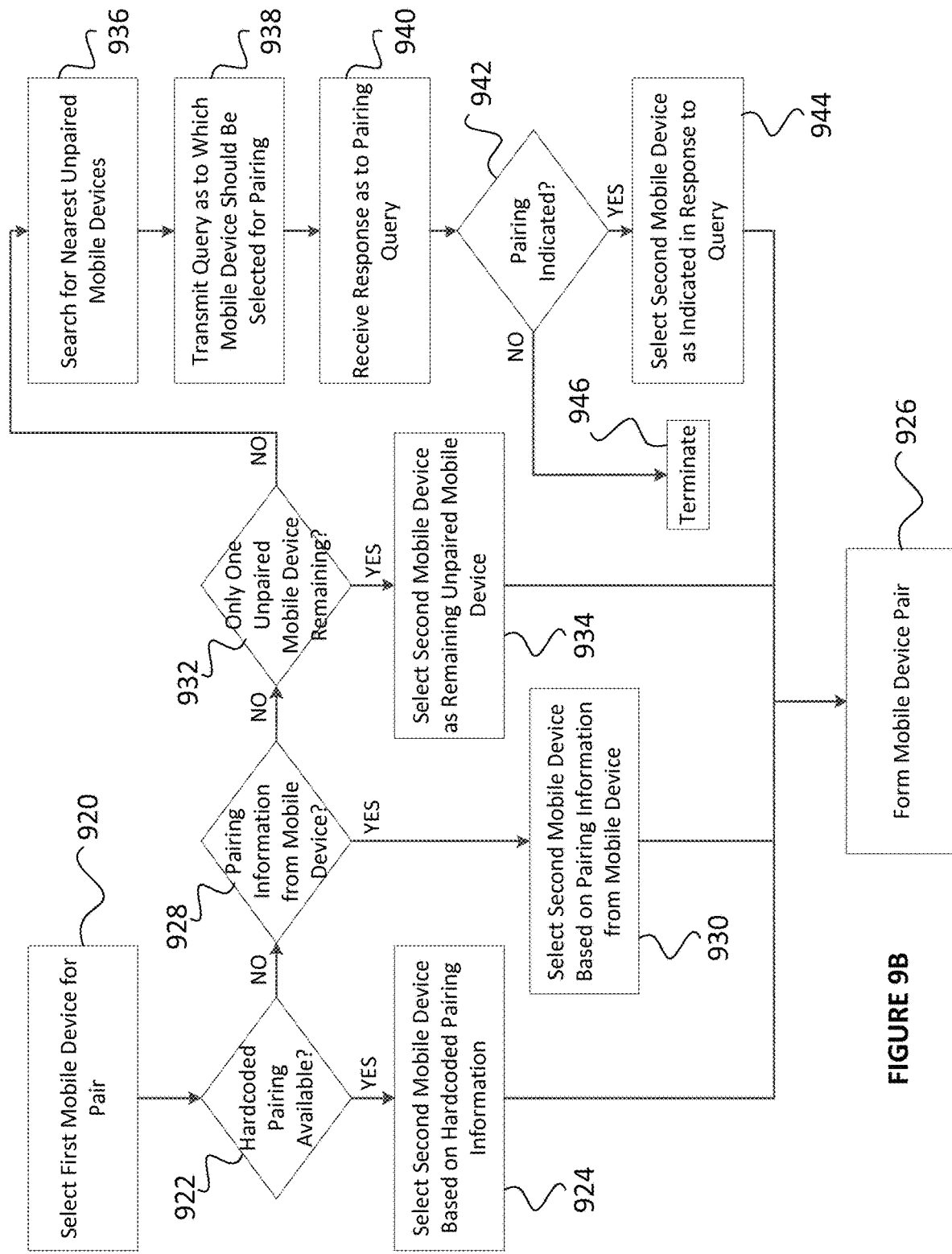
FIG. 9B shows a flowchart for a method for pairing mobile devices for measurement at an application server in accordance with some embodiments.

FIG. 9B shows a flowchart for a method for pairing mobile devices for measurement at an application server in accordance with some embodiments. The process begins at step 920. At step 920, the application server selects a first mobile device from which to form a pair or pairing group. The application server may select the first mobile device using a variety of techniques. The application server may select the first mobile device as a mobile device from which a ready status message was recently received.

The process continues at step 922. At step 922, the applications server determines whether hardcoded pairing information is available for the first mobile device.

If the application server determines that hardcoded pairing information does exist for the first mobile device at step 922, then the process continues at step 924. At step 924, the application server retrieves the hardcoded pairing information. This hardcoded pairing information may be information that indicates two or more mobile devices that are always used in tandem with one another. The application server selects as the paired mobile devices any of those mobile devices that are hardcoded as having a pairing with the first mobile device. In this figure, a single second mobile device is shown as being the hardcoded pair for the first mobile device. In this case, the application server selects the indicated second mobile device as the other member of the pair and then proceeds to form the mobile device pair at step 926. In other embodiments, the application server may verify whether a ready status message has been recently received from the second mobile device. Where no such ready status message has been recently received, the application server may terminate the process and wait for such a message from the second mobile device. Alternatively, where no such ready status message has been recently received, the application server may try to form a pairing with the first mobile device using other techniques, such as those described with respect to this figure.

If the application server determines that hardcoded pairing information does not exist for the first mobile device at step 922, then the process continues at step 928. At step 928, the application server determines whether pairing information was received from the first mobile device. This pairing information may have been sent with the ready status message.

If the application server determines that pairing information was received from the first mobile device at step 928, then the process continues at step 930. At step 930, the application server retrieves the pairing information received from the first mobile device. This pairing information may be information that indicates a second or more mobile devices with which the first mobile device is expected to be paired with. This value may be entered by the operator or coded as a temporary value on a daily or other basis based on which mobile devices are being used together. The application server selects as the paired mobile devices any of those mobile devices that are indicated by the pairing information received from first mobile device. In this figure, a single second mobile device is shown as being indicated. In this case, the application server selects the indicated second mobile device as the other member of the pair and then proceeds to form the mobile device pair at step 926. In other embodiments, the application server may verify whether a ready status message has been recently received from the second mobile device. Where no such ready status message has been recently received, the application server may terminate the process and wait for such a message from the second mobile device. Alternatively, where no such ready status message has been recently received, the application server may try to form a pairing with the first mobile device using other techniques, such as those described with respect to this figure.

If the application server determines that pairing information was not received from the first mobile device at step

928, then the process continues at step 932. At step 932, the application server determines whether only a single second mobile device exists that is both unpaired and from which a ready status message was recently received.

If the application server determines that only a single second mobile device exists that is both unpaired and from which a ready status message was recently received at step 932, then the process continues at step 934. At step 934, the application server selects the unpaired and ready second mobile device as the mobile device for pairing with the first mobile device. To perform this technique, the application server may maintain information as to a pool of ready but unpaired mobile devices in the system. Based on this pairing, the process proceeds to form the mobile device pair at step 926.

If the application server determines that it is not the case that only a single second mobile device exists that is both unpaired and from which a ready status message was recently received at step 932, then the process continues at step 936. At step 936, the application server reviews the pool of ready mobile devices and determines the geographic distance between those mobile devices and the first mobile device. The application server may select a finite number, N, of these ready mobile devices, such as by selecting the five geographically nearest mobile devices to the first mobile device.

The process continues at step 938. At step 938, the application server transmits a query to the first mobile device as to which other mobile devices should be selected for the pairing. This transmission may include information as to the unique identifiers of the other mobile devices as well as their geographic locations. This transmission may include only the N nearest mobile devices as selected in the previous step. The mobile device may display this information using the software application, allowing the software application or the operator to select one or more of the other mobile devices for pairing.

The process continues at step 940. At step 940, the application server receives a response from the first mobile device related to the pairing query transmitted in the previous step. This response may contain information in response to the query indicating which other mobile devices should be selected for pairing with the first mobile device. Alternatively, this response may contain an indicator that none of the other mobile devices should be paired with the first mobile device.

At step 942, the application server determines whether the response from the first mobile device indicates which other mobile devices should be used for pairing.

If the application server determines that the response indicates that none of the other mobile device should be selected for pairing at step 942, then the process terminates at step 946.

If the application server determines that the response indicates which of the other mobile device should be selected for pairing at step 942, then the process terminates at step 944. At step 944, the application server selects the indicated other mobile devices for pairing with the first mobile device. Based on this pairing, the process proceeds to form the mobile device pair at step 926.

In other embodiments, different processes for pairing mobile devices may be used. For instance, in some embodiments, the determination at step 932 and the selection at step 934 may not be advantageous, in which case these steps may be omitted. In some embodiments, the application server may query the first mobile device for the unique identifiers of the other mobile devices with which the first mobile device should be paired. In some embodiments, a third-party, such as a computer or user at an operating center, may be queried as to what pairings to perform.

Figure 9C:
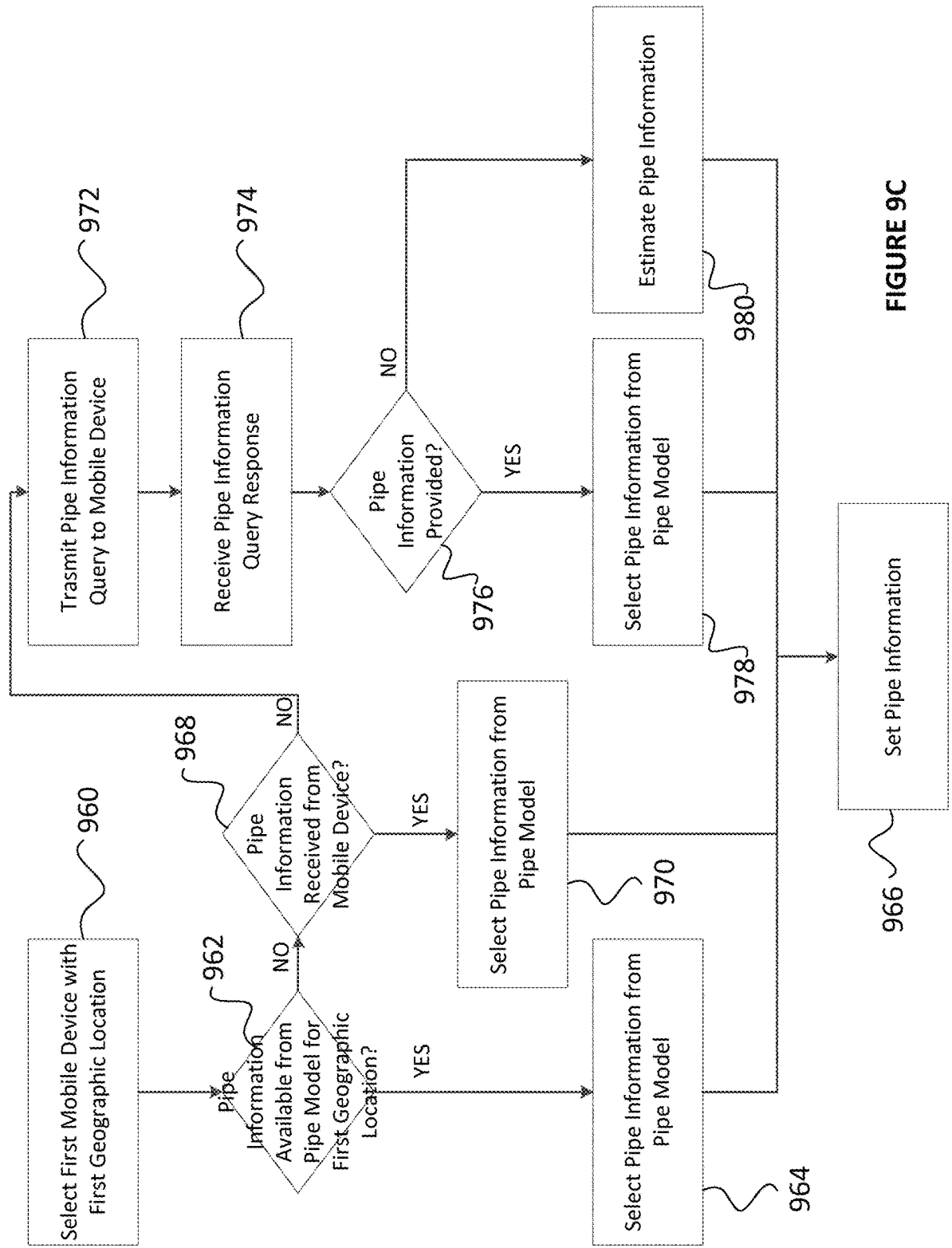
FIG. 9C shows a flowchart for a method for retrieving pipe information at an application server in accordance with some embodiments.

FIG. 9C shows a flowchart for a method for retrieving pipe information at an application server in accordance with some embodiments. The process begins at step 960. At step 920, the application server selects a first mobile device with respect to which pipe information will be retrieved. By selecting the first mobile device, the application server is also selecting the first geographic location where the first mobile device is located. The application server may select the first mobile device using a variety of techniques. The application server may select the first mobile device as a mobile device from which a ready status message was recently received.

The process continues at step 962. At step 962, the application server determines whether pipe information is available for the first geographic location from a pipe model. The pipe information may be as described previously, such as pipe material, material surrounding the pipe, diameter of the pipe, fluid flowing through the pipe, etc. The pipe model may be as described previously, such as a representation of the physical pipe network including information as to pipe segments, location of pipe segments, locations of fixed sensors, locations of mobile sensors, etc. The determination in this step may involve comparing the first geographic location to the pipe model to determine if a pipe segment with accompanying pipe information exists at or near the first pipe location.

If the application server determines that pipe information is available for the first geographic location from the pipe model in step 962, then the process continues at step 964. At step 964, the application server selects the pipe information from the pipe model and then proceeds to set the pipe information at step 966.

If the application server determines that pipe information is not available for the first geographic location from the pipe model in step 962, then the process continues at step 968. At step 968, the application server determines whether pipe information was received form the first mobile device for the first geographic location. This pipe information may have been received as part of the ready status message received from the first mobile device.

If the application server determines that pipe information was received for the first geographic location from the first mobile device in step 968, then the process continues at step 970. At step 970, the application server selects the pipe information received from the first mobile device and then proceeds to set the pipe information at step 966.

If the application server determines that pipe information was not received for the first geographic location from the first mobile device in step 968, then the process continues at step 972. At step 972, the application server transmits a pipe information query message to the first mobile device. This query message may query the software application on the first mobile device or the operator of the first mobile device to enter pipe information.

The process continues at step 974. At step 974, the application server receives a pipe information query response from the first mobile device. This query response may or may not contain the queried pipe information.

The process continues at step 976. At step 976, the application server determines whether the queried pipe information was included in the pipe information query response received from the first mobile device.

If the application server determines that the queried pipe information was included in the pipe information query response received from the first mobile device at step 976, then the process continues at step 978. At step 978, the application server selects the pipe information received in the query response and then proceeds to set the pipe information at step 966.

If the application server determines that the queried pipe information was not included in the pipe information query response received from the first mobile device at step 978, then the process continues at step 980. At step 980, the application server estimates the pipe information. This estimation may be performed in a variety of ways. For instance, the application server may maintain average parameters for each of the various types of pipe information and thereby use these average parameters for the pipe information. In some embodiments, the application server may select the pipe information available in the pipe model for the nearest point to the first geographic location and use that information as the pipe information. In some embodiments, the application server may select the pipe information available in the pipe model for several nearby points to the first geographic location and use an aggregate of that information for the pipe information. The application server then proceeds to set the pipe information at step 966.

In step 966, the application server may set the pipe information using a variety of techniques. The application server may store the pipe information in a volatile memory device for later use. The application server may store the pipe information in a non-volatile memory device for later use. The application server may set the pipe information in various other ways.

Figure 10A:
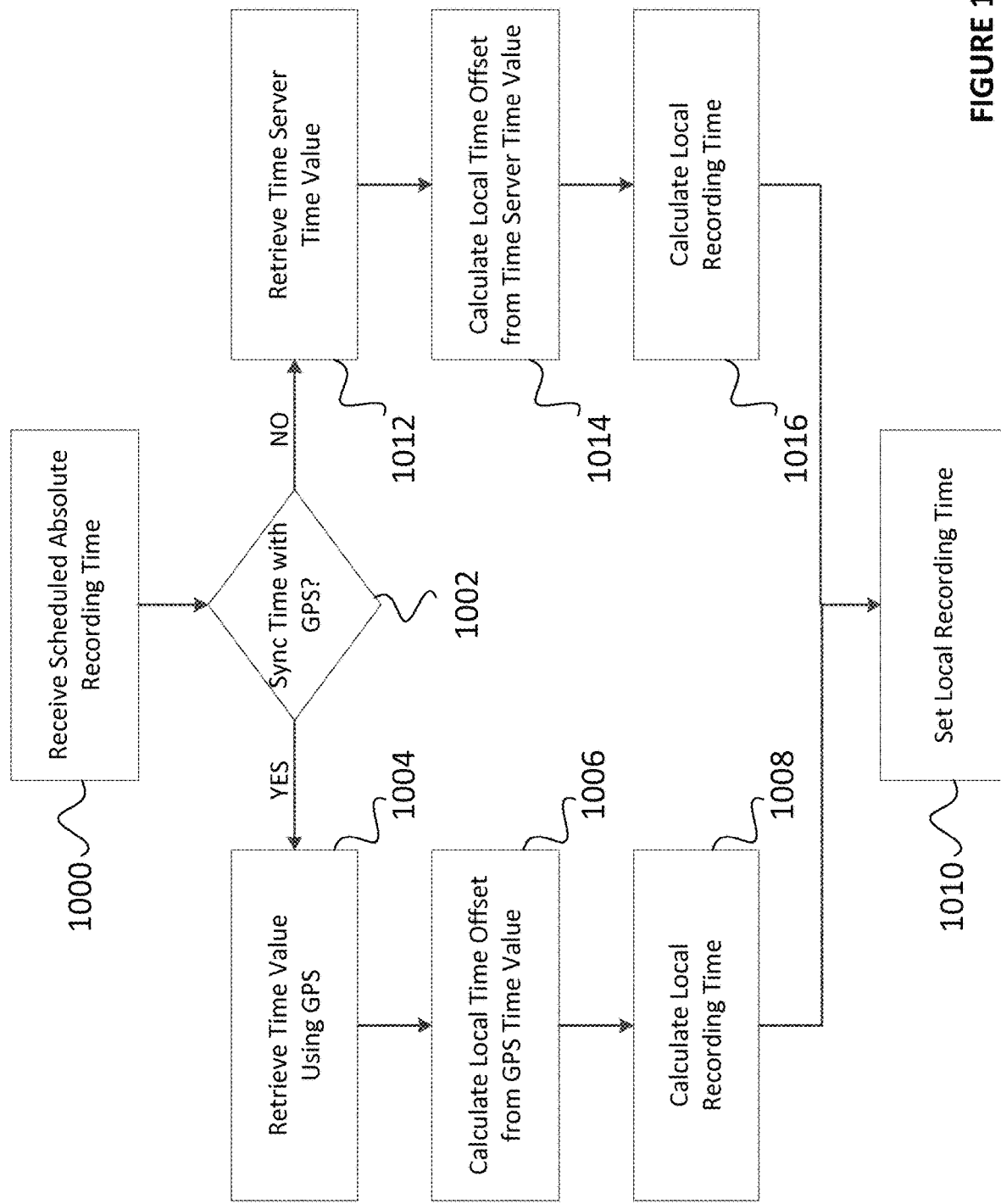
FIG. 10A shows a flowchart for synchronizing recording time at a mobile device in accordance with some embodiments.

FIG. 10A shows a flowchart for synchronizing recording time at a mobile device in accordance with some embodiments. The process begins at step 1000. At step 1000, the mobile device receives the scheduled absolute recording time. This absolute recording time may be received as from a transmission from the application server.

The process continues at step 1002. At step 1002, the mobile device determines whether time synchronization will be performed using the GPS system. This determination may be made based on a variety of factors. For instance, the mobile device may make this determination based on a preference for using GPS time synchronization. The mobile device may make this determination based on a preference for using some other forms of time synchronization. The mobile device may make this determination based on whether the GPS module is receiving GPS signals at the present time.

If the mobile device determines that the GPS system will be used for time synchronization at step 1002, then the process continues at step 1004. At step 1004, the mobile device retrieves a time value from the GPS system using the GPS module running on the mobile device. This request may involve the leak detection software application running on the mobile device requesting a GPS time value from the operating system. The software application may then wait as the operating system processes the request, issues a request to the GPS module, waits for the GPS module to receive and process a GPS satellite signal, and then return the GPS time value to the software application. In such situations, there may be a level of unpredictability as to how quickly the leak detection software application will receive a GPS time value after placing the request. This unpredictability is based primarily on the fact that the leak detection software application does not have a hardware interface to the GPS module. Because of this, the leak detection software application must compete for the hardware resources on the mobile device as managed by the mobile device operating system. Therefore, the request for a GPS time value may not always be processed in the same amount of time based on the other processes running on the mobile device and the other processes requesting information from the GPS module.

The process continues at step 1006. At step 1006, the mobile device calculates a local time offset from the GPS time value. This calculation may be performed in a variety of ways. This calculation may be performed by comparing the local clock of the mobile device to the time value received from the GPS module. This calculation may further take into account the variability in the delay for receiving the GPS time value as requested through software from the GPS module. This calculation may further perform a statistical analysis, such as regression analysis, on the difference between the local clock of the mobile device and the GPS time value as measured at various points in time.

The process continues at step 1008. At step 1008, the mobile device calculates a local recording time, based on the absolute recording time and the local time offset. In some embodiments, the local recording time may be calculated as the absolute recording time shifted forward or backward in time in order to cancel the effect of the local time offset. The process then sets the local recording time at step 1010.

If the mobile device determines that the GPS system will not be used for time synchronization at step 1002, then the process continues at step 1012. At step 1012, the mobile device retrieves a time value from a time server. This time server may be as previously described, such as one implementing the Network Time Protocol ("NTP").

The process continues at step 1014. At step 1006, the mobile device calculates a local time offset from the time server time value. This calculation may be performed in a variety of ways. This calculation may be performed by comparing the local clock of the mobile device to the time value received from the time server. This calculation may further perform a statistical analysis, such as regression analysis, on the difference between the local clock of the mobile device and the time server time value as measured at various points in time. In some embodiments, the calculation of a local time offset in this step may be substantially built into a network time protocol. In such cases, the use of the network time protocol, such as NTP, may result in the performance of both step 1012 and step 1014 together.

The process continues at step 1016. At step 1016, the mobile device calculates a local recording time, based on the absolute recording time and the local time offset. In some embodiments, the local recording time may be calculated as the absolute recording time shifted forward or backward in time in order to cancel the effect of the local time offset. The process then sets the local recording time at step 1010.

Figure 10B:
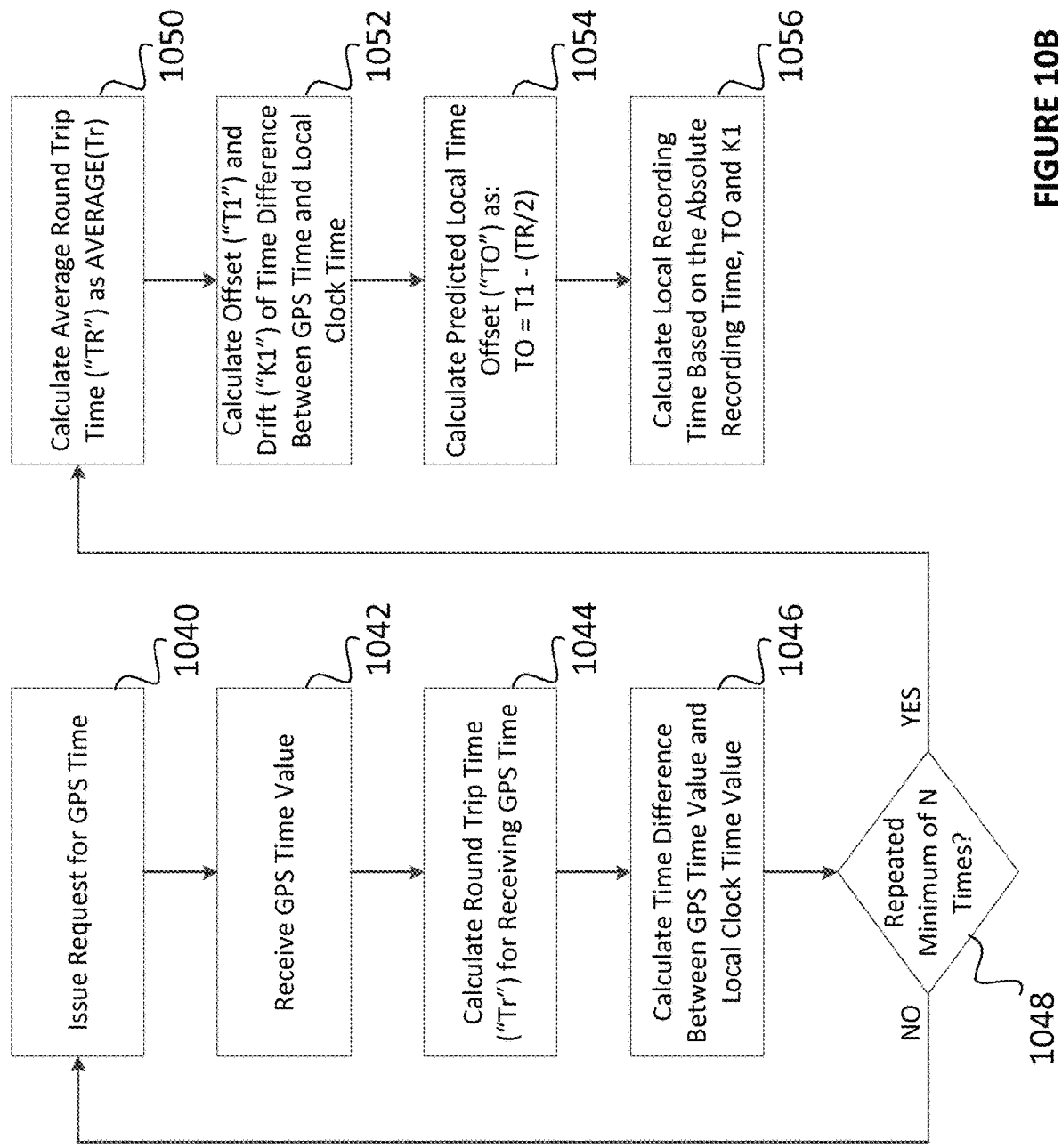
FIG. 10B shows a flowchart for synchronizing recording time using GPS at a mobile device in accordance with some embodiments.

FIG. 10B shows a flowchart for synchronizing recording time using GPS at a mobile device in accordance with some embodiments. In the process of this figure, the mobile device calculates a local recording time based on an absolute recording time and various factors local to the mobile device.

The process begins at step 1040. At step 1040, the leak detection software application issues a request for a GPS time value. As described with respect to the previous figures, this request may be performed as a request made through software that has some variability in the time of response.

The process continues at step 1042. At step 1042, the leak detection software application receives a time value from the GPS module.

The process continues at step 1044. At step 1044, the leak detection software application calculates a round trip time ("Tr") for the GPS time value request. Tr is the time the elapsed between the request for a GPS time value in step 1040 and the receipt of the GPS time value in step 1042. This instance of Tr is calculated based on the most recent iteration of steps 1040 and 1042.

The process continues at step 1046. At step 1046, the leak detection software application calculates the time difference between the GPS time value and the local clock time value for the local clock of the mobile device.

The process continues at step 1048. At step 1048, the leak detection software application determines whether a minimum number, N, of iterations of steps 1040-1046 have been performed. This minimum number of iterations may be useful to ensure that the statistical analysis of the following steps is based on a sufficiently large number of samples of the local clock time difference from the GPS time value. In some embodiments N is a hardcoded value. In some embodiments, N set to 100. In other embodiments, a minimum number of iterations may not be used, but rather a minimum period of time elapsed between the first iteration of steps 1040-1046 and the time of processing the present iteration of step 1048 may be used.

If the leak detection software application determines at step 1048 that a sufficient number of iterations of steps 1040-1046 have not been completed, then the process continues at step 1040.

If the leak detection software application determines at step 1048 that a sufficient number of iterations of steps 1040-1046 have been completed, then the process continues at step 1050. At step 1050, the leak detection software application calculates an average of the GPS round trip time ("TR") calculated as the average of the individually calculated GPS round trip times Tr. This may be represented as: TR=AVERAGE(Tr).

The process continues at step 1052. At step 1052, the leak detection software application calculates an offset ("T1") and a drift ("K1") for the local clock with respect to the GPS time values. The offset T1 provides a time difference between the local clock time value and the GPS time value. The drift K1 provides a presently observed change in offset T1 over a unit of time. In some embodiments, offset T1 and drift K1 may be calculated using linear regression of the various differences between the local clock time value and the GPS time value as recorded during the iterations of step 1046.

The process continues at step 1054. At step 1054, the leak detection software application calculates a predicted local time offset ("TO") based on the previously calculated average GPS round trip time TR the offset T1. This calculation may be represented as: TO=T1−(TR/2). Through such a calculation, the leak detection software application creates the predicted local time offset TO based on the calculated offset T1 while attributing part of the offset T1 to the time elapsed from the receipt of the GPS time value in the GPS module to the time of receipt of the GPS time value in the leak detection software application.

The process continues at step 1056. At step 1056, the leak detection software application calculates a local recording time based on the absolute recording time ("ART"), the predicted local time offset TO, and the drift K1. The local recording time may be calculated by shifting the absolute recording time forward or backward in time based on the calculated predicted local time offset TO, with adjustment for drift K1. The local recording time ("LRT") may be calculated as: LRT=ART−LRT−((ART−LRT)−NOW( ))*K1. In this example, NOW( ) is a representation of the present time at the time that the LRT value is calculated.

Figure 11:
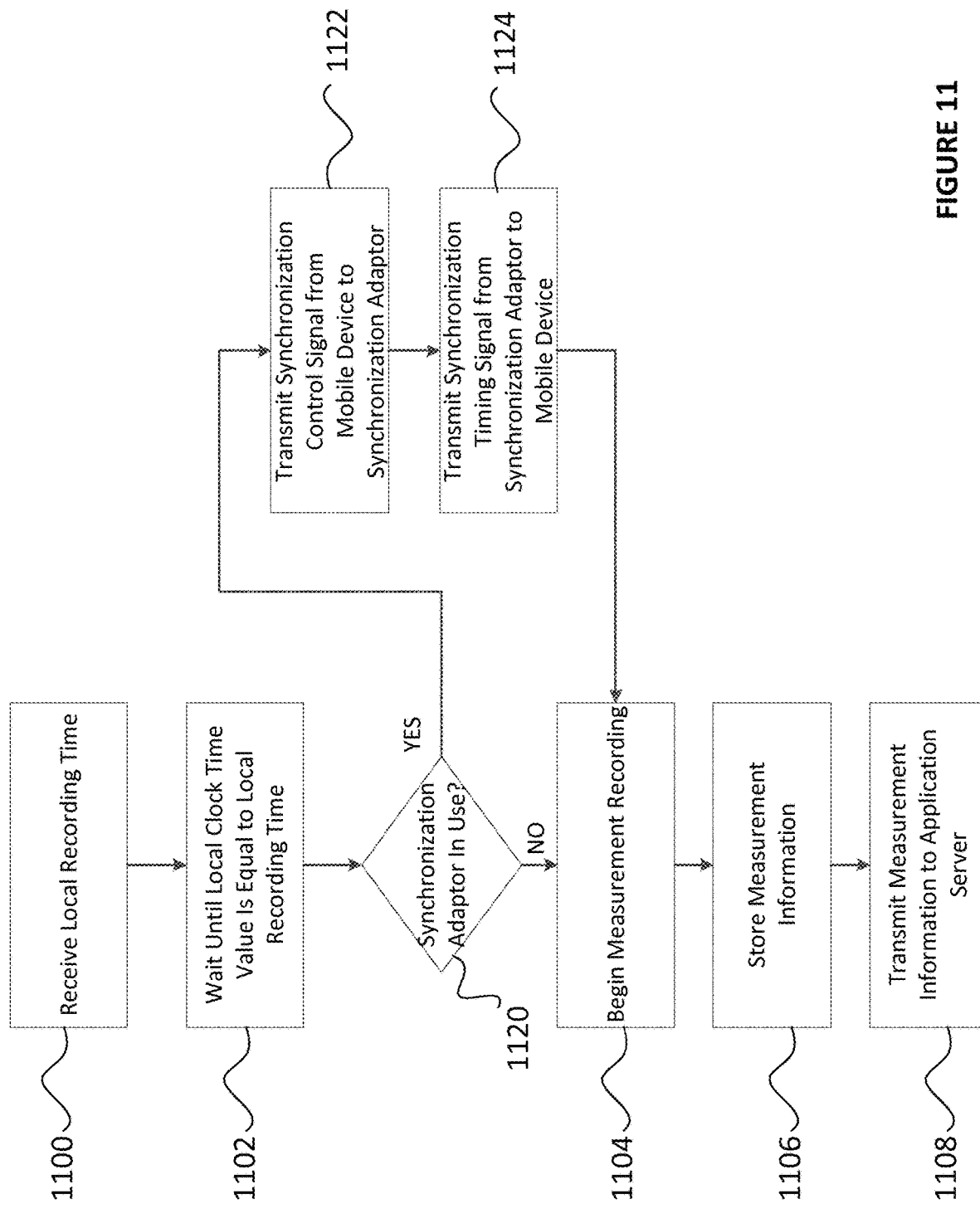
FIG. 11 shows a flowchart for recording measurements in accordance with some embodiments.

FIG. 11 shows a flowchart for recording measurements in accordance with some embodiments. The process begins at step 1100. At step 1100, the mobile device receives the local recording time. This local recording time may be received from the leak detection software application as calculated by that software application. In such a case, the local recoding time may simply be retrieved from memory or already available to the mobile device and the leak detection software application.

The process continues at step 1102. At step 1102, the mobile device, the mobile sensor, and the leak detection software application wait until the local clock time value is equal to the local recording time.

The process continues at step 1120. At step 1120, a determination is made as to whether a synchronization adaptor is in use. If so, the process continues at step 1122. Otherwise, the process continues at step 1104.

At step 1122, the mobile device transmits a synchronization control signal from the mobile device to the synchronization adaptor. At this point, the local recording time has been reached, so sensor measurement recording should begin. However, in order to allow later synchronization of the sensor measurements recorded by this mobile sensor with those of another mobile sensor, a timing synchronization signal is used. This may be produced by a highly accurate timing module, such as a GPS module. In particular, a GPS module my have a hardware interface with the synchronization adaptor so that a GPS timing signal can be received from the GPS module without significant latency, such as that caused by a software interface. The GPS timing signal may be, for example, a highly accurate 1 pulse-per-second signal generate by the GPS module based on information from GPS satellites. The process continues at step 1124.

At step 1124, the timing synchronization signal, such as the GPS 1 pulse-per-second signal, is transmitted from the synchronization adaptor to the mobile device. The mobile device may receive this timing synchronization signal as if it were a sensor measurement, and thereby store it with sensor measurements for later processing. The process continues at step 1104.

At step 1104, the mobile sensor begins recording sensor measurements because the local recording time has been reached.

The process continues at step 1106. At step 1106, the mobile device stores measurement information, including the timing synchronization signal if present. This storage may involve storage of information in memory of the recording device, storage of information in memory of the mobile device, real-time transmission of the measurement information to the application server, or any other processing of the sensor measurements.

The process continues at step 1108. At step 1108, the mobile device transmits the stored measurement information to the application server.

Figure 12:
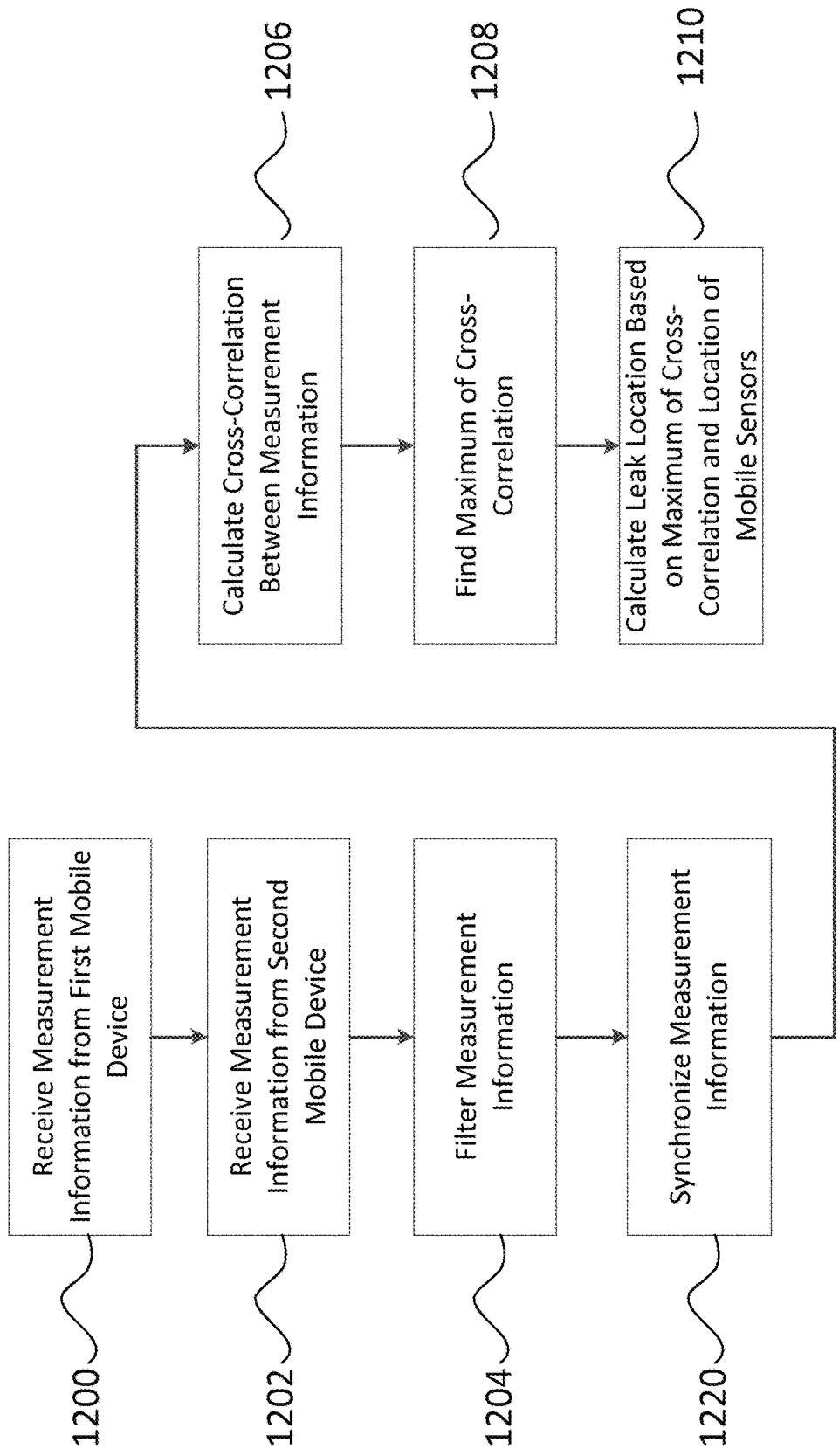
FIG. 12 shows a flowchart for detecting a leak location in accordance with some embodiments.

FIG. 12 shows a flowchart for detecting a leak location in accordance with some embodiments. The process begins at step 1200. At step 1200, the application server receives measurement information from a first mobile device, i.e., first sensor measurements. At step 1202, the application server receives measurement information from a second mobile device, i.e., second sensor measurements. At step 1204, the application server may filter the measurement information based on the pipe information, as described previously.

The process continues at step 1220. At step 1220, the application server synchronizes the first sensor measurements and second sensor measurements. This synchronization is performed based on any timing synchronization signals included as part of the first and second sensor measurements. In particular, as explained previously, a mobile device may store as sensor measurements a combination of actual sensor measurements from the mobile sensor as well as the timing synchronization signal produced by the synchronization adaptor. Therefore, the first and second sensor measurements are aggregate sensor readings, each containing both a timing synchronization signal portion and a sensor reading portion. Based on the timing synchronization portion contained in each of the first and second aggregate sensor readings, the application server can synchronize the first and second aggregate sensor readings, and thereby synchronize the sensor reading portions contained therein.

The process continues at step 1206. At step 1206, the application server calculates the cross-correlation between the now synchronized sensor reading portions received from the first and second mobile devices. At step 1208, the application server calculates a maximum point for the cross-correlation as described previously with respect to FIG. 3. At step 1210, the application server calculates a leak location based on the maximum of the cross-correlation and based on the location of the mobile sensors, as described previously with respect to FIG. 3. With the sensor reading portions synchronized in this way prior to calculations based on cross-correlation, a more accurate estimate of the leak location can be produced.

Figure 13:
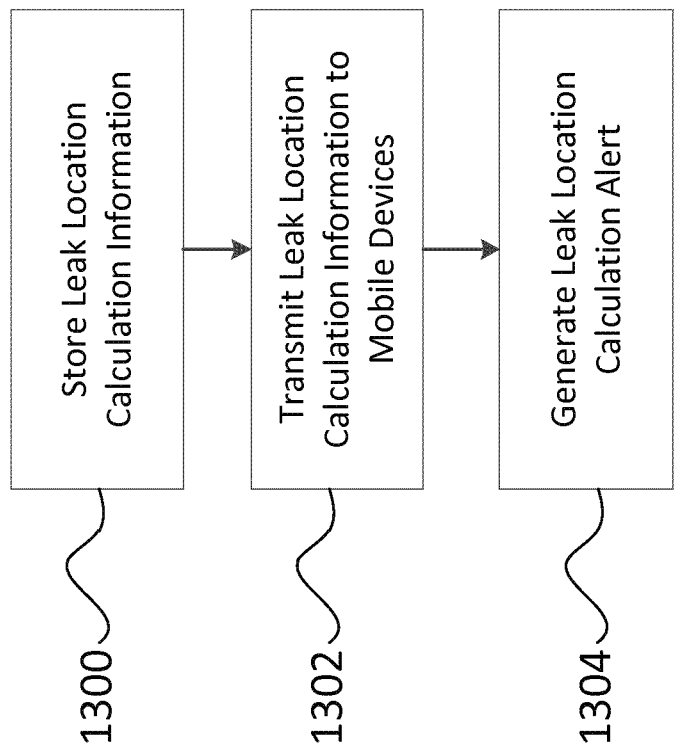
FIG. 13 shows a flowchart for outputting results in accordance with some embodiments.

FIG. 13 shows a flowchart for outputting results in accordance with some embodiments. The process begins at step 1300. At step 1300, the application server stores information about the calculated leak location. At step 1302, the application server transmits the calculated leak location information to the mobile devices that were used to record sensor measurements. At step 1304, the application server generates an alert as to the calculation of the leak location. The application server may transmit this alert to a third-party, such as a computer or a user at an operating center. In other embodiments, other forms of output may be used.

Figure 14A:
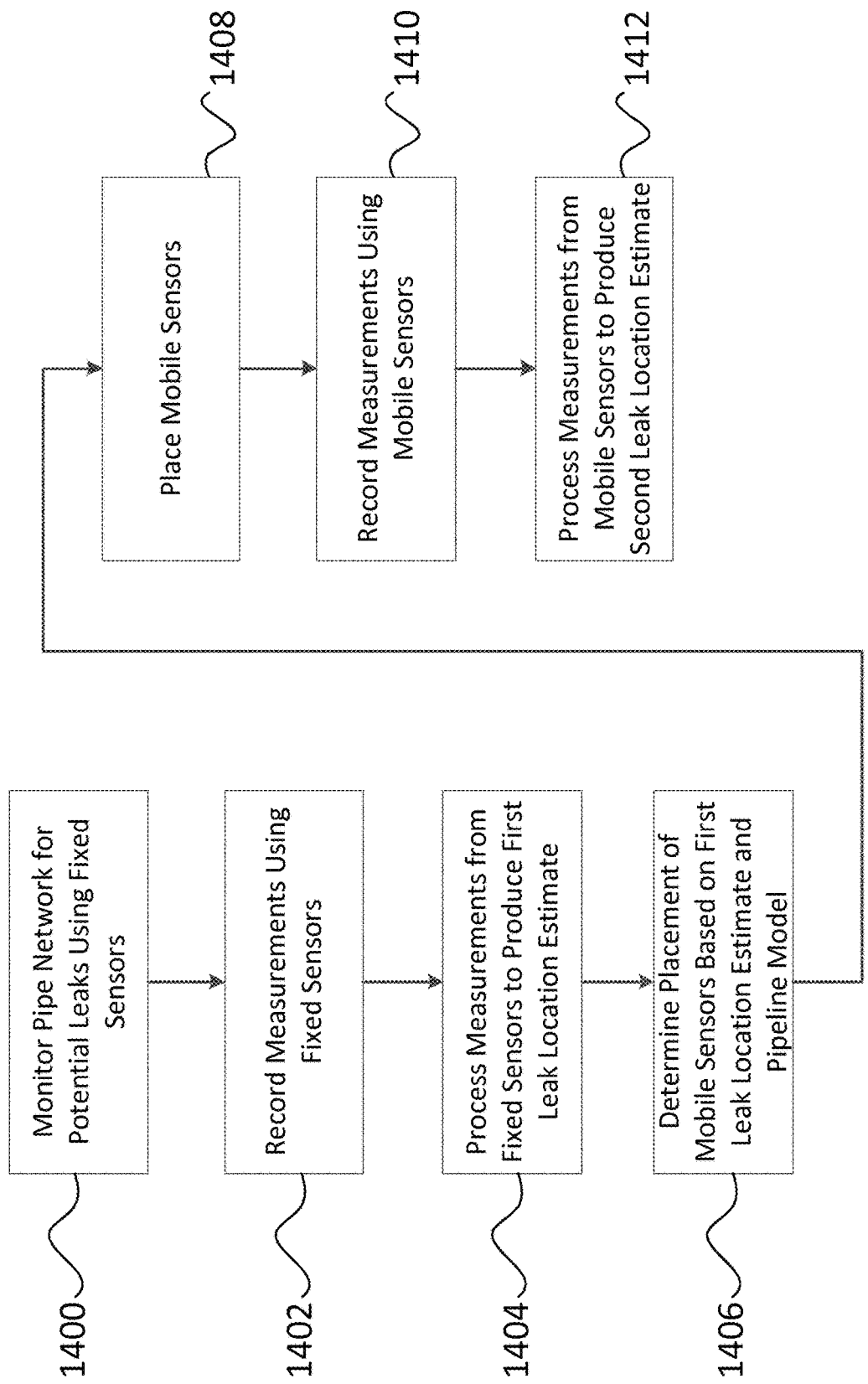
FIG. 14A shows a flowchart for a method of detecting location of leaks in a pipeline network using both fixed sensors and mobile sensors in accordance with some embodiments.

FIG. 14A shows a flowchart for a method of detecting location of leaks in a pipeline network using both fixed sensors and mobile sensors in accordance with some embodiments.

The process begins at step 1400. At step 1400, fixed sensors provided permanently at portions along the pipeline network monitor the pipeline network for potential leaks. This step of monitoring may be performed in a variety of ways. In some embodiments, a small number of fixed sensors may be provided at locations along the pipeline network to periodically check sensor measurements, such as vibration values. These fixed sensors may periodically transmit sensor measurements to the application server. These fixed sensors may only transmit sensor measurements when a leak has been detected.

The process continues at step 1402. At step 1402, a leak has been detected in the pipeline network, so the fixed sensors record sensor measurements. The fixed sensors may record the sensor measurements in a synchronized way as scheduled by the application server. The fixed sensors may transmit the sensor measurement information to the application server as part of this step.

The process continues at step 1404. At step 1404, the application server processes the sensor measurement information provided by the fixed sensors. This step may be performed using cross-correlation analysis as previously described or using some other technique. Based on the processing of the fixed sensor measurements, the application server is able to produce a first leak location estimate. However, the first leak location estimate may be somewhat inaccurate. This inaccuracy may arise for a variety of reasons. First, in some embodiments, the fixed sensors may not have the advanced software and hardware necessary to perform accurate calculation of a local recording time as described previously. As such, the sensor measurements may not be as accurately synchronized between multiple fixed sensors. This may then introduce error in the estimated leak location due to the cross-correlation function being affected by the less accurate sensor synchronization. Second, in some cases, the fixed sensors may not be located close to the leak location. A greater distance between the sensor and the leak location increases inaccuracy in the measurements by that sensor in that the received sensor reading is weaker at the sensor and intervening factors may introduce noise that alters the sensor reading. For example, if the sensor is a fixed vibration sensor far from the leak location, the received vibration signal may be very weak when received at the sensor. Furthermore, there are likely to be more external sources of vibration, such as produced by construction activities or moving transit vehicles, between the sensor and the leak given the longer distance. In some embodiments, the velocity of sound as it passes through the pipes of the pipeline network may be used in estimating the location of the leak. However, the velocity of sound in such cases is usually only known approximately, given that changes in the pipe material, the fluid flowing through the pipe, the material around the pipe, and other factors may create local changes in the velocity of sound along the pipeline network. Therefore, in such cases, the longer distance between a fixed sensor and a leak may increase inaccuracy in the location estimate as the approximated velocity of sound becomes less accurate for the longer pipe distance covered. Additionally, the length of pipe for different segments of the pipeline network may only be approximations, in which case a longer distance between a fixed sensor and a leak may cause greater inaccuracy in the estimated pipe length being covered.

Based on these expected inaccuracies in the first leak location estimate, the application server may use various rules or calculations to determine an error value associated with the first leak location estimate. This error value may take a variety of forms. The application server may calculate a confidence value associated with the leak location estimate, where the confidence value expresses a confidence in the accuracy of the leak location estimate. The application server may calculate an error radius as the error value associated with the first leak location estimate.

In some embodiments, the application server may calculate an error radius associated with the leak location estimate, where the error radius expresses an area around the estimated leak location where the leak may also likely be located. In some embodiments, the application server may use a predefined error value to determine the error radius. For example, the application server may define an error radius as 2% of the pipe length between two sensors used for sensor measurements. Alternatively, the application server may define an error radius as 3% of the pipe length between two sensors used for sensor measurements. As an example of error radius calculation, consider a first sensor and a second sensor located 100 meters from one another, and a leak location is estimated to be on the pipe between the two sensors at a distance of 40 meters from the first sensor. The error radius may be set as 2% of 100 meters, which is 2 meters.

When an error radius is calculated, it may be used to determine whether the leak may exist on some pipe other than the pipe length running between the two sensors. In particular, the application server may estimate the leak location and calculate an error radius. Based on these values, the application server may refer to the pipe model to determine if there is a pipe connection within the distance of the error radius in any direction from the estimated leak location. If such a pipe connection does exist within the error radius, then the leak may be occurred in some other pipes of the pipeline network that are connected through the connection that is within the error radius. Therefore, the use of an error radius may be used to determine if further sensor measurements should be taken given the potential error in the leak location estimate. Similarly, the use of an error radius may be used to determine where further sensor measurements should be taken given the potential error in the leak location estimate and the pipe connection identified to be within the error radius. In some embodiments, more than one pipe connection may be within the error radius.

The process continues at step 1406. At step 1406, the application server determines the placement of mobile sensors based on the first leak location estimate and the pipeline model. In this step, the application server has calculated a leak location estimate based on the sensor measurements of the fixed sensors. However, as noted, there may be a higher degree of inaccuracy in the estimate based on the fixed sensors as compared to an estimate based on measurements from mobile sensors. Therefore, a second level of sensor measurements will be taken using mobile sensors. In this step, the application server may use a variety of rules and heuristics to choose the location for placement of the mobile sensors. The application server may use the pipeline model to determine where available attachment points are located near the estimated leak location. The application server may choose to place the mobile sensors at the two or more mobile sensor attachment points located closest to the estimated leak location. Where the first leak location estimate includes an error radius, the application server may choose to place the mobile sensors at the two or more mobile sensors attachment points located closest to but outside the error radius. The application server may choose to place the mobile sensors at locations that lie on a line perpendicular to the line between the fixed sensors used for the initial measurements in the previous steps. This selection may allow better accuracy by producing a two-dimensional estimate of the leak location when the mobile sensors are used for leak location estimation. The application server may transmit the determined mobile sensor placement information to the mobile devices.

The process continues at step 1408. At step 1408, operators of the mobile sensors and attached mobile devices place the mobile sensors at the specified mobile sensor location. The operators attach the mobile sensors to the pipeline network as necessary.

The process continues at step 1410. At step 1410, the mobile sensors record sensor measurements. This may be performed as previously described. As part of this step, the mobile devices may transmit the sensor measurement information to the application server.

The process continues at step 1412. At step 1412, the application server processes the sensor measurement information provided by the mobile sensors. This step may be performed using cross-correlation analysis as previously described or using some other technique. Based on the processing of the mobile sensor measurements, the application server is able to produce a second leak location estimate. It is expected that the second leak location estimate may be a more accurate estimate of the location of the leak than was the first leak location estimate based on the reasons discussed for step 1404 above. At this point, the application server has calculated a first leak location estimate based on fixed sensors, chosen the location of mobile sensors based on the first leak location estimate, and then calculated a more accurate second leak location estimate based on the mobile sensors. The application server may output the results of the leak location estimate as previously described.

Figure 14B:
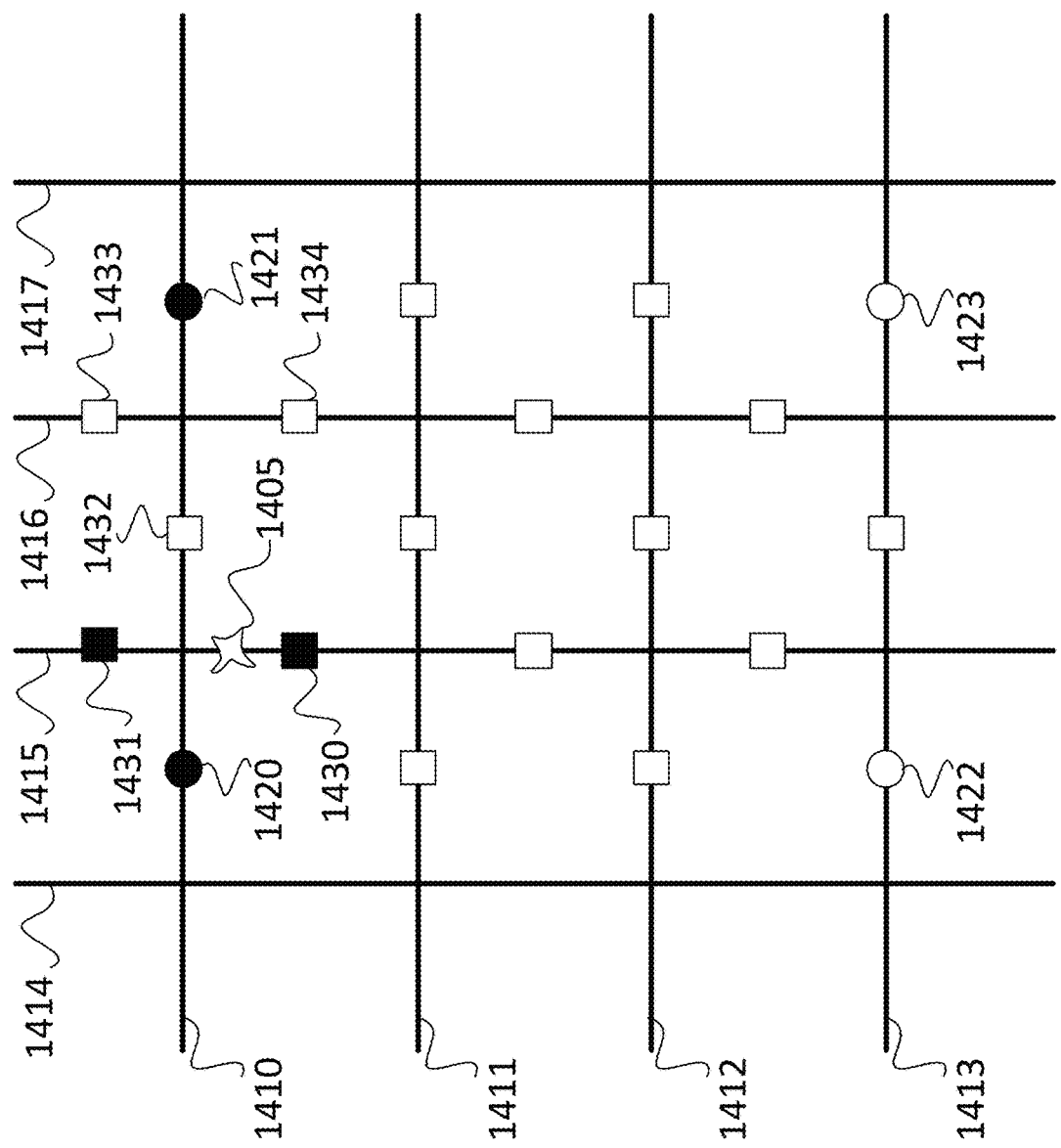
FIG. 14B is a diagram showing detection of the location of leaks in a pipeline network using both fixed sensors and mobile sensors in accordance with some embodiments.

FIG. 14B is a diagram showing detection of the location of leaks in a pipeline network using both fixed sensors and mobile sensors in accordance with some embodiments.

As shown in the figure, a pipeline network is provided consisting of pipes 1410-1417. Fixed sensors 1420-1423 (denoted with circles) are provided along the pipeline network. Various mobile sensor attachment points (denoted with squares) including mobile sensor attachment points 1430-1434 are provided along the pipeline network. These mobile sensor attachment points may be fire hydrants used for attachment of mobile sensors in some embodiments. A leak 1405 has occurred in the pipeline network. For fixed sensors 1420-1423 and mobile sensor attachment points 1430-1434, a filled in circle or square, respectively, indicates that a sensor measurement is taken at that location for the estimation of the location of leak 1405.

In the illustration of this figure, a leak 1405 has occurred and is detected. Leak 1405 may be detected by fixed sensors 1420-1423 or by some other technique. Based on the detection of leak 1405, the location of leak 1405 needs to be estimated. Fixed sensors 1420 and 1421 are used to take sensor measurements, such as vibration measurements, to estimate the location of leak 1405. Fixed sensors 1420 and 1421 may be chosen instead of fixed sensors 1422 and 1423 based on the vibration signal being stronger at the former pair of fixed sensors as compared to the latter pair of fixed sensors.

Using fixed sensors 1420 and 1421, the location of leak 1405 is estimated along with an associated error value. The estimated location along with the associated error value may indicate that the leak 1405 is located somewhere between fixed sensor 1420 and mobile sensor attachment point 1432, but without enough accuracy to specify in greater detail.

Mobile sensor attachment points 1430 and 1431 are then chosen as points at which to attach mobile sensors and record sensor measurements. Based on this decision, operators take mobile sensors with attached mobile devices to these two locations and attach mobile sensors, such as mobile vibration sensors, to mobile sensor attachment points 1430 and 1431. Sensor measurements are then taken from these mobile sensors and an updated leak location estimate is produced. The updated leak location estimate along with the associated error value may indicate that the leak 1405 is located on pipe 1415 between its intersection with pipe 1410 and mobile sensor attachment point 1430. This estimate may provide even further accuracy, specifying a more particular location on pipe 1415 where leak 1405 is estimated to be located. By this technique, a first leak location estimate was produced based on fixed sensors, mobile sensor locations were chosen based on the first leak location estimate, and then a more accurate second leak location estimate was produced based on the mobile sensors.

Figure 15A:
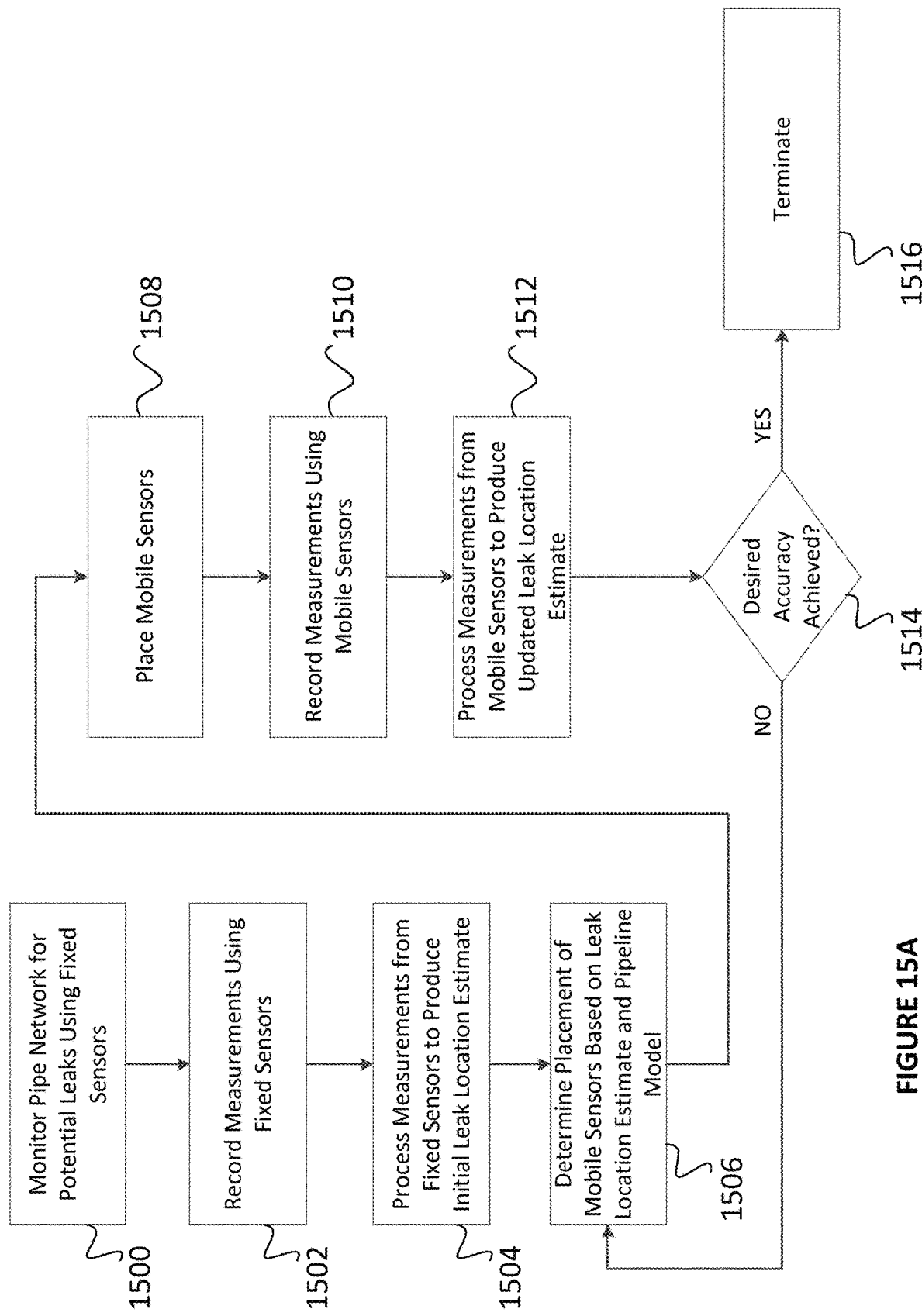
FIG. 15A shows a flowchart for a method of detecting location of leaks in a pipeline network using both fixed sensors and mobile sensors in accordance with some embodiments.

FIG. 15A shows a flowchart for a method of detecting locations of leaks in a pipeline network using both fixed sensors and mobile sensors in accordance with some embodiments. The process begins at step 1500. Steps 1500, 1502, and 1504 may be substantially similar to steps 1400, 1402, and 1404 as described with respect to FIG. 14A. Steps 1508, 1510, and 1512 may be substantially similar to steps 1408, 1410, and 1412 as described with respect to FIG. 14A. However, the process in FIG. 15A differs from that in FIG. 14A based on steps 1506, 1514, and 1516.

In step 1506, the application server determines the placement of the mobile sensors as in step 1406 of FIG. 14A. However, in step 1506, this placement is determined based on the most recent leak location estimate. The most recent leak location estimate may be based on that produced from the fixed sensors in step 1504, but it may also be that produced from the mobile sensors in step 1512. In some embodiments, the application server may not use only the most recent leak location estimate to determine mobile sensor placement in step 1506, but rather an aggregation of all previously calculated leak location estimates.

In step 1514, the application server determines whether the leak location estimate from step 1512 has reached a desired level of accuracy. This determination may be made based on an error value accompanying the leak location estimate. This determination may be made based on a predefined minimum confidence or maximum error level set in the application server.

If the application server determines in step 1514 that the desired accuracy level has not yet been achieved in the leak location estimate, then the application server performs another set of measurements and estimation with the mobile sensors as per steps 1506-1512.

If the application server determines in step 1516 that the desired accuracy level has been achieved in the leak location estimate, then the process terminates at step 1516. The application server may output the results of the leak location estimate as previously described as part of this step.

In some embodiments, step 1514 may allow iteration of the mobile sensor placement based on a factor other than a desired accuracy level. For instance, step 1514 may cause iteration of steps 1506-1512 based on a predefined number of iterations to be performed. In some embodiments, this predefined number of iterations to be performed may be two iterations of steps 1506-1512.

Figure 15B:
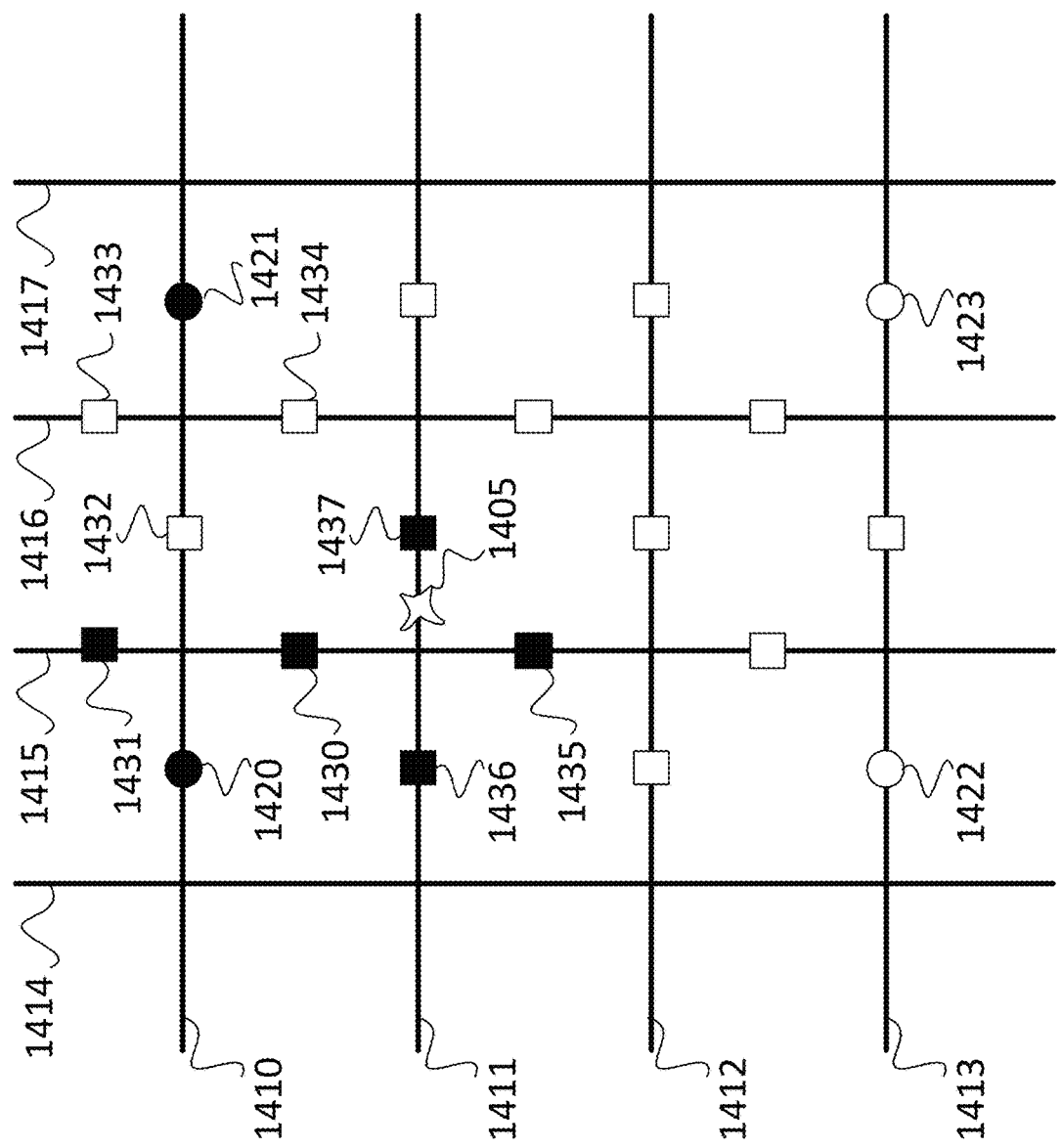
FIG. 15B is a diagram showing detection of the location of leaks in a pipeline network using both fixed sensors and mobile sensors in accordance with some embodiments.

FIG. 15B is a diagram showing detection of the location of leaks in a pipeline network using both fixed sensors and mobile sensors in accordance with some embodiments.

As shown in the figure, a pipeline network is provided consisting of pipes 1410-1417. Fixed sensors 1420-1423 (denoted with circles) are provided along the pipeline network. Various mobile sensor attachment points (denoted with squares) including mobile sensor attachment points 1430-1437 are provided along the pipeline network. These mobile sensor attachment points may be fire hydrants used for attachment of mobile sensors in some embodiments. A leak 1405 has occurred in the pipeline network. For fixed sensors 1420-1423 and mobile sensor attachment points 1430-1437, a filled in circle or square, respectively, indicates that a sensor measurement is taken at that location for the estimation of the location of leak 1405.

In the illustration of this figure, a leak 1405 has occurred and is detected. Leak 1405 may be detected by fixed sensors 1420-1423 or by some other technique. Based on the detection of leak 1405, the location of leak 1405 needs to be estimated. Fixed sensors 1420 and 1421 are used to take sensor measurements, such as vibration measurements, to estimate the location of leak 1405. Fixed sensors 1420 and 1421 may be chosen instead of fixed sensors 1422 and 1423 based on the vibration signal being stronger at the former pair of fixed sensors as compared to the latter pair of fixed sensors.

Using fixed sensors 1420 and 1421, the location of leak 1405 is estimated along with an associated error value. The estimated location along with the associated error value may indicate that the leak 1405 is located somewhere between fixed sensor 1420 and pipe 1416, but without enough accuracy to specify in greater detail.

Mobile sensor attachment points 1430 and 1431 are then chosen as points at which to attach mobile sensors and record sensor measurements. Based on this decision, operators take mobile sensors with attached mobile devices to these two locations and attach mobile sensors, such as mobile vibration sensors, to mobile sensor attachment points 1430 and 1431. Sensor measurements are then taken from these mobile sensors and an updated leak location estimate is produced. The updated leak location estimate along with the associated error value may indicate that the leak 1405 is located somewhere between mobile sensor attachment point 1530 and mobile sensor attachment point 1430, but without enough accuracy to specify in greater detail. If this estimate is not of sufficient accuracy, another set of measurements may be taken.

Mobile sensor attachment points 1430 and 1435 are then chosen as points at which to attach mobile sensors and record sensor measurements. Based on this decision, operators take mobile sensors with attached mobile devices to these two locations and attach mobile sensors, such as mobile vibration sensors, to mobile sensor attachment points 1430 and 1435. Sensor measurements are then taken from these mobile sensors and an updated leak location estimate is produced. The updated leak location estimate along with the associated error value may indicate that the leak 1405 is located somewhere along pipe 1411, but without enough accuracy to specify in greater detail. If this estimate is not of sufficient accuracy, another set of measurements may be taken.

Mobile sensor attachment points 1436 and 1437 are then chosen as points at which to attach mobile sensors and record sensor measurements. Based on this decision, operators take mobile sensors with attached mobile devices to these two locations and attach mobile sensors, such as mobile vibration sensors, to mobile sensor attachment points 1436 and 1437. Sensor measurements are then taken from these mobile sensors and an updated leak location estimate is produced. The updated leak location estimate along with the associated error value may indicate that the leak 1405 is located on pipe 1411 between its intersection with pipe 1415 and mobile sensor attachment point 1437. This estimate may provide even further accuracy, specifying a more particular location on pipe 1411 where leak 1405 is estimated to be located. If the accuracy of this leak location estimate is sufficient, then no further mobile sensor readings may be necessary. By this technique, a first leak location estimate was produced based on fixed sensors and then three iterations of mobile sensor estimates were produced with locations for the mobile sensors determined by the updated location estimates.

Figure 16:
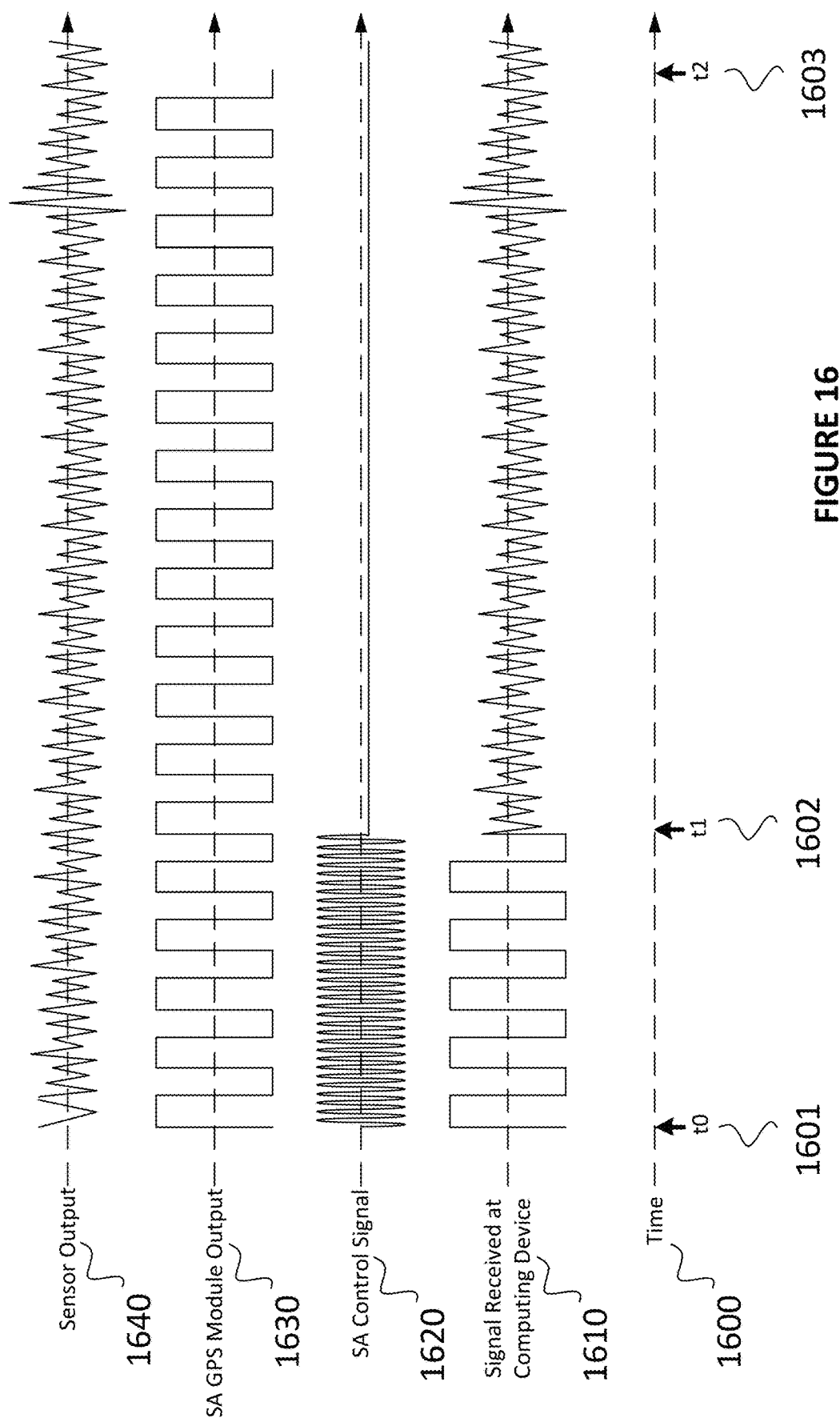
FIG. 16 is a diagram showing various signals involved during sensor measurement using a synchronization adaptor in accordance with some embodiments.

FIG. 16 is a diagram showing various signals involved during sensor measurement using a synchronization adaptor according to some embodiments. A time line 1600 is shown, with time increasing from left to right across the figure. The time line 1600 includes time points t0 1601, t1 1602, and t2 1603. A signal received at the computing device 1610 is shown. This may be the signal stored by the computing device for later processing. A control signal at the synchronization adaptor 1620 is shown. This may be a control signal provided to a switch provided as part of the synchronization adaptor. A synchronization adaptor GPS module output signal 1630 is shown. This may be one of numerous output signals provided by a GPS module provided as part of the synchronization adaptor. A sensor output signal 1640 is shown. This may be a sensor output generated by the sensor when making sensor measurements of a signal source. Based on the signals shown in this figure, a functionality during sensor measurement can be described.

At time t0 1601, the computing device has been connected to the synchronization adaptor, and the synchronization adaptor has been connected to the sensor. Furthermore, the sensor has been connected to a signal source of the sensor measurements. Time t0 1601 may be a point in time scheduled for beginning sensor measurements. This may be an absolute time or an absolute time with a local offset value as previously described herein. At time t0 1601, the sensor output signal 1640 reflects some sensor readings produced by the sensor based on the signal source. These may be provided from the sensor to the synchronization adaptor. At time t0 1601, the synchronization adaptor GPS module output signal 1630 reflects some highly accurate timing signal provided by the GPS module, such as a 1 pulse-per-second signal provided by the GPS module. At time t0 1601, a non-zero value for the control signal at the synchronization adaptor 1620 is provided. Based on the non-zero value for the control signal at the synchronization adaptor 1620, the synchronization adaptor controls a switch so that the synchronization adaptor GPS module output signal 1630 is provided to the computing device instead of the sensor output signal 1640. As such, at time t0 1601, the signal received at the computing device 1610 reflects the synchronization adaptor GPS module output signal 1630.

For the time period between t0 1601 and t1 1602, the configuration of the signals just described for time t0 1601 continues. As such, the computing device continues to receive as the signal received at the computing device 1610 a signal reflecting a timing synchronization signal provided by the synchronization adaptor. Various durations can be used for the time period between t0 1601 and t1 1602. For instance, a period of five seconds may be used.

At time t1 1602, the control signal at the synchronization adaptor 1620 changes to a zero or near-zero signal. As a result of the zero or near-zero control signal at the synchronization adaptor 1620, the synchronization adaptor controls a switch so that the sensor output signal 1640 is provided to the computing device instead of the synchronization adaptor GPS module output signal 1630. As such, at time t1 1602, the signal received at the computing device 1610 reflects the sensor output signal 1640.

For the time period between t1 1602 and t2 1603, the configuration of the signals just described for time t1 1602 continues. As such, the computing device continues to receive as the signal received at the computing device 1610 a signal reflecting actual sensor readings from the sensor.

The system may continue to record sensor measurements in this fashion through and past time t2 1603. At some point, the sensor measurements may be stopped, and the signal received at the computing device 1610 may be used for further processing. In this way, an aggregate sensor reading, i.e., the signal received at the computing device 1610, containing both a timing synchronization signal portion and a sensor reading portion may be produced and used for further processing.

While this exemplary embodiment has demonstrated various characteristics, other embodiments may be differently configured. For example, while the signal received at the computing device 1610 contains a distinct timing synchronization signal portion that does not overlap with the sensor reading portion, different configurations of the system may result in different arrangement of these portions. For instance, if an adder is used in the synchronization adaptor instead of the switch, then the computing device may receive both the synchronization adaptor GPS module output signal 1630 and the sensor output signal 1640 at the same time. This would result in the timing synchronization signal portion overlapping with the sensor reading portion. This could be configured to have complete overlap, partial overlap, or some other arrangement of the aggregate signal portions. Where the portions do overlap, the computing device or some other device may have to separate the timing synchronization signal portion overlapping with the sensor reading portion so that they can be used for later processing. This configuration of the timing synchronization signal portion overlapping with the sensor reading portion may additionally be used where the sensor and synchronization adaptor provide their respective sensor output signal 1640 and synchronization adaptor GPS module output signal 1630 to the computing device separately but on the same communication channel, such as on a wireless channel.

Figure 17:
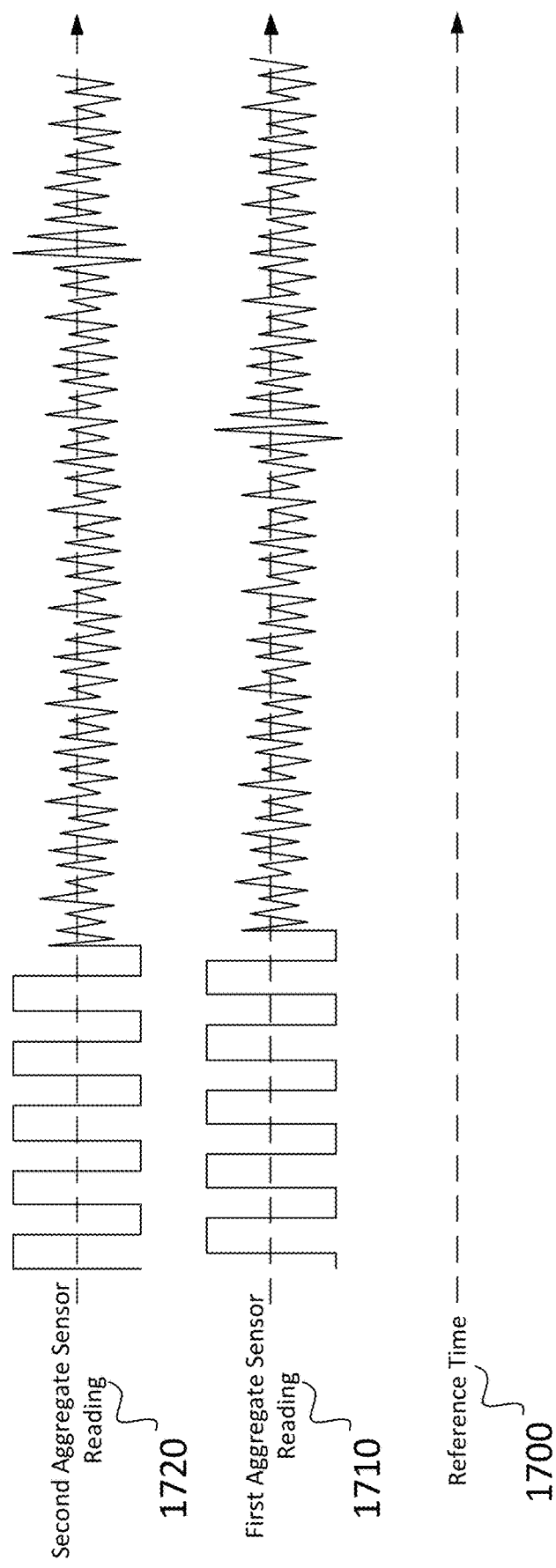
FIG. 17 is a diagram showing various signals involved during processing of sensor measurements using a synchronization adaptor in accordance with some embodiments.
Figure 18:
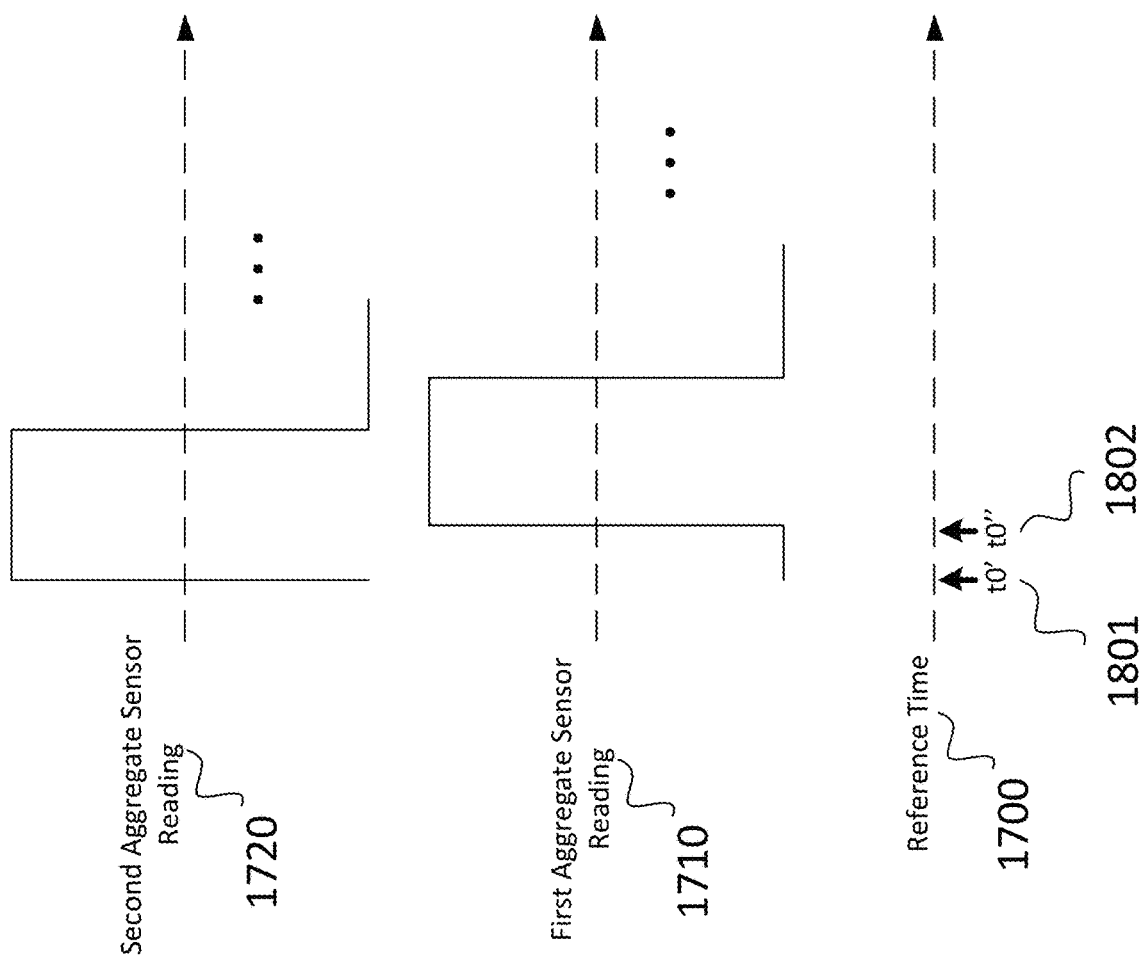
FIG. 18 is a diagram showing various signals involved during processing of sensor measurements using a synchronization adaptor in accordance with some embodiments.
Figure 19:
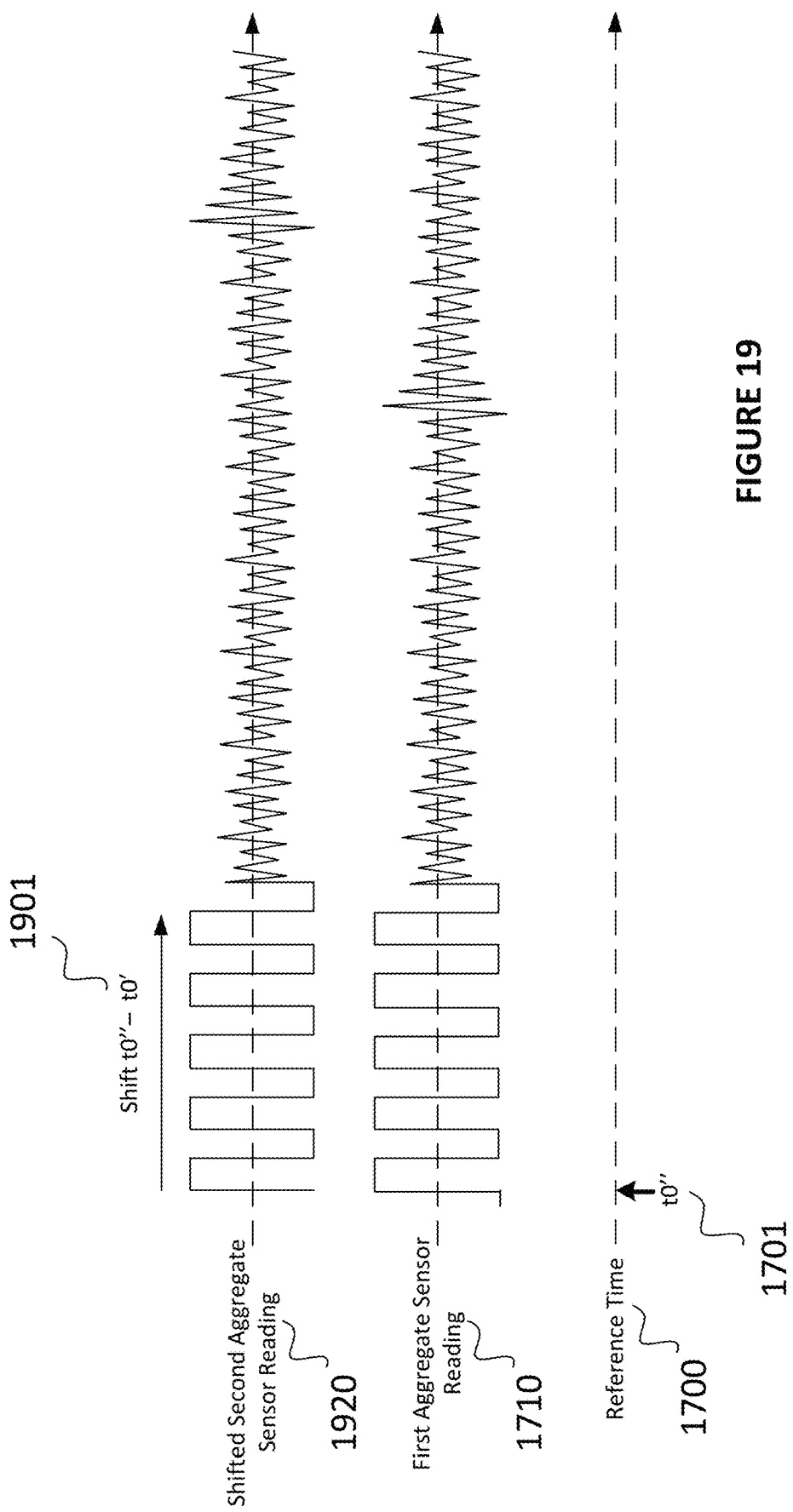
FIG. 19 is a diagram showing various signals involved during processing of sensor measurements using a synchronization adaptor in accordance with some embodiments.

FIGS. 17-19 are diagrams showing various signals involved during processing of sensor measurements using a synchronization adaptor according to some embodiments. FIG. 17 shows two aggregate sensor readings received for processing. A first aggregate sensor reading 1710 is received from a first computing device, and a second aggregate sensor reading 1720 is received from a second computing device. The first and second aggregate sensor readings 1710 and 1720 each contain a timing synchronization signal portion and a sensor reading portion as shown. The first and second aggregate sensor readings 1710 and 1720 are shown with respect to a reference time line 1700. This is referred to as a "reference" time line as opposed to simply a time line as in the previous figure to reflect that the signals shown need not be recording as time progresses but are rather shown with respect to the time at which they were recorded.

As shown in closer detail in FIG. 18, while the first and second aggregate sensor readings 1710 and 1720 were recorded at nearly the same time, there is a slight difference to the time at which the first and second aggregate sensor readings 1710 and 1720 were recorded. FIG. 18 shows just the beginning of each signal from FIG. 17. This is evident because, while the beginning of both of the first and second aggregate sensor readings 1710 and 1720 are aligned with respect to the reference time, the pulses of the timing synchronization signal are not aligned. Namely, the first rising edge of a timing synchronization pulse for the first aggregate sensor reading 1710 occurs at time t0" 1802. However, the first rising edge of a timing synchronization pulse for the second aggregate sensor reading occurs at time t0' 1801. Because the timing synchronization signal pulses were produced by a highly accurate time source, such as the hardware interface to a GPS module as previously described, these timing synchronization signal pulses should align. Therefore, it is clear that the first and second aggregate sensor readings 1710 and 1720 are not perfectly synchronized. Somewhat counterintuitively, this suggests that the second computing device began recording the second aggregate sensor reading at time t0' 1802, while the first computing device began recording the first aggregate sensor reading at time t0' 1801.

This near, but not exact match in recording start times may result from each of the first and second computing devices that recorded the first and second aggregate sensor readings 1710 and 1720, respectively, being scheduled to begin recording at "t0." As previously explained herein, the first and second computing devices may perform various techniques to begin recording as accurately as possible at the absolute time t0. However, slight inaccuracies in the estimate of the absolute time t0 may remain at each of the first and second computing devices, as reflected in the imperfect synchronization shown in this figure. These slight inaccuracies may arise from, for instance, the timing module producing a time estimate based on a value from a GPS module in the computing device, where the internal communication delays in both hardware and software introduce inaccuracies in the received timing value.

However, using the timing synchronization signal portion included in each of the first and second aggregate sensor readings 1710 and 1720, the two signals can be synchronized and the difference between the start times removed. FIG. 19 shows the first aggregate sensor reading 1710 and a shifted second aggregate sensor reading 1920. The shifted second aggregate sensor reading 1920 has been produced using a shift 1901 of the second aggregate sensor reading 1720 by a value of (t0"–t0') with respect to the reference time 1700. In this way, both the first aggregate sensor reading 1710 and shifted second aggregate sensor reading 1920 are provided as more accurately synchronized with respect to the reference time 1700. The first aggregate sensor reading 1710 and shifted second aggregate sensor reading 1920 can then be used in further processing, such as cross-correlation analysis for the determination of a leak location as described previously.

While this exemplary embodiment has demonstrated various characteristics, other embodiments may be differently configured. For example, while this exemplary embodiment used a comparison of the first rising edge of a pulse in the timing synchronization portion, other techniques for determining a synchronization inaccuracy can be used. For instance, a difference in timing of a last falling edge or a difference in numerous timing synchronization pulses may be used. As another example, while this exemplary embodiment used a simply shift to align the first rising edge of a pulse of the timing synchronization signal, some embodiments may involve a determination of whether a shift to the right or the left should be performed based on which direction produces the smaller amount of shift.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

What is claimed is:

1. A system comprising:
a sensor configured to detect sensor inputs from a signal source and generate a sensor output signal;
a synchronization adaptor configured to:
generate a timing synchronization signal,
receive the sensor output signal from the sensor,
transmit the timing synchronization signal on a communication channel, and
transmit the sensor output signal on the communication channel; and
a mobile computing device configured to:
generate a synchronization control signal,
transmit the synchronization control signal via an audio channel of an audio jack of the mobile computing device to the synchronization adaptor, and
receive the sensor output signal and the timing synchronization signal via a microphone channel of the audio jack of the mobile computing device from the synchronization adaptor,
wherein the synchronization adaptor comprises:
a control signal input port configured to receive the synchronization control signal from the mobile computing device; and
a switch configured to control between transmitting the timing synchronization signal and transmitting the sensor output signal on the communication channel to the mobile computing device based on the synchronization control signal generated by the mobile computing device.

2. The system of claim 1, wherein the synchronization adaptor further comprises:
a Global Positioning System module configured to generate a GPS timing signal, wherein the timing synchronization signal is based at least in part on the GPS timing signal.

3. The system of claim 1,
wherein the audio channel is a right audio channel or a left audio channel of the audio jack.

4. The system of claim 1, wherein the sensor is a mobile sensor.

5. The system of claim 1, wherein the mobile computing device is a smartphone and the audio jack is a standard audio jack of the smartphone.

6. The system of claim 1, wherein the signal source is a pipe of a pipe network, wherein the sensor is a vibration sensor, and wherein the sensor inputs are vibrations emanating from the pipe.

7. The system of claim 2, wherein the GPS timing signal is a 1 pulse-per-second signal.

8. The system of claim 1, wherein the switch selectively outputs the sensor output signal and the timing synchronization signal to a microphone output port of the synchronization adaptor based on the synchronization control signal.

9. The system of claim 1, wherein the switch receives the synchronization control signal from an audio input port of the synchronization adaptor.

10. The system of claim 9, wherein the audio input port of the synchronization adaptor is a left audio input port or a right audio input port.

11. The system of claim 1,
wherein when the synchronization control signal satisfies a predetermined value, the switch provides the sensor output signal for transmission on the communication channel, and
wherein when the synchronization control signal does not satisfy the predetermined value, the switch provides the timing synchronization signal for transmission on the communication channel.

12. A system comprising:
a sensor configured to detect sensor inputs from a signal source and generate a sensor output signal; and
a synchronization adaptor comprising a switch, the synchronization adaptor configured to:
generate a timing synchronization signal;
receive the sensor output signal from the sensor;
receive a synchronization control signal via an audio input port of the synchronization adaptor from a mobile computing device;
transmit the timing synchronization signal on a communication channel, and
transmit the sensor output signal on the communication channel,
wherein the switch of the synchronization adaptor is configured to:
selectively output the sensor output signal and the timing synchronization signal to a microphone output port of the synchronization adaptor based on the synchronization control signal received from the mobile computing device; and
control between transmitting the timing synchronization signal and transmitting the sensor output signal on the communication channel to the mobile computing device based on the synchronization control signal received from the mobile computing device.

13. The system of claim 12,
wherein when the synchronization control signal satisfies a predetermined value, the switch provides the sensor output signal for transmission on the communication channel to the mobile computing device, and
wherein when the synchronization control signal does not satisfy the predetermined value, the switch provides the timing synchronization signal for transmission on the communication channel to the mobile computing device.

14. The system of claim 12, wherein the synchronization adaptor further comprises:
a Global Positioning System module configured to generate a GPS timing signal, wherein the timing synchronization signal is generated based at least in part on the GPS timing signal.

15. The system of claim 12, wherein the signal source is a pipe of a pipe network, wherein the sensor is a vibration sensor, and wherein the sensor inputs are vibrations emanating from the pipe.

16. A synchronization adaptor device comprising:
a sensor input port configured to receive a sensor output signal from a sensor;
a control signal input port configured to receive a synchronization control signal from a mobile computing device;
a Global Positioning System module configured to generate a GPS timing signal, wherein a timing synchronization signal is generated based at least in part on the GPS timing signal; and
a switch configured to control between transmitting the timing synchronization signal and transmitting the sensor output signal on a communication channel to the mobile computing device based on the synchronization control signal received from the mobile computing device,
wherein when the synchronization control signal received from the mobile computing device satisfies a predetermined value, the switch provides the sensor output signal for transmission on the communication channel to the mobile computing device, and
wherein when the synchronization control signal received from the mobile computing device does not satisfy the predetermined value, the switch provides the timing synchronization signal for transmission on the communication channel to the mobile computing device.

17. The synchronization adaptor device of claim 16, wherein the control signal input port is an audio input port of the synchronization adaptor device.

18. The synchronization adaptor device of claim 16, wherein the switch selectively outputs the sensor output signal and the timing synchronization signal to a microphone output port of the synchronization adaptor device based on the synchronization control signal.

19. The synchronization adaptor device of claim 16, wherein the timing synchronization signal is based on a 1 pulse-per-second signal generated by the Global Positioning System module.

20. The synchronization adaptor device of claim 16, wherein the sensor is a vibration sensor, and wherein the sensor output signal is generated by the vibration sensor based on detecting vibrations emanating from a pipe.

* * * * *